(12) United States Patent
Miller

(10) Patent No.: US 8,032,340 B2
(45) Date of Patent: Oct. 4, 2011

(54) METHOD AND SYSTEM FOR MODELING A PROCESS VARIABLE IN A PROCESS PLANT

(75) Inventor: John Philip Miller, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 905 days.

(21) Appl. No.: 11/619,830

(22) Filed: Jan. 4, 2007

(65) Prior Publication Data
US 2008/0177513 A1   Jul. 24, 2008

(51) Int. Cl.
G06F 7/60 (2006.01)
G06F 17/10 (2006.01)
(52) U.S. Cl. .......................................... 703/2
(58) Field of Classification Search ............... 703/2
See application file for complete search history.

(56) References Cited

U.S. PATENT DOCUMENTS

| | | |
|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,121,467 A | 6/1992 | Skeirik |
| 5,134,574 A | 7/1992 | Beaverstock et al. |

(Continued)

FOREIGN PATENT DOCUMENTS

EP     0 612 039 A2     8/1994

(Continued)

OTHER PUBLICATIONS

International Search Report for PCT/US2007/088593, mailed Jun. 16, 2008.

(Continued)

*Primary Examiner* — Paul Rodriguez
*Assistant Examiner* — Aniss Chad
(74) *Attorney, Agent, or Firm* — Marshall, Gerstein & Borun LLP

(57) ABSTRACT

In a method for generating a model for modeling at least a portion of the process plant, M process variable data sets, where M is an integer, may be used to determine statistical data that may be utilized to scale process variable data sets. The M process variable data sets are scaled and then utilized to calculate intermediate model terms. For each additional process variable data set, it is scaled using the statistical data and then utilized to update the intermediate model terms. When an adequate number of process variable data sets have been processed, the model may be calculated using the intermediate model terms.

26 Claims, 18 Drawing Sheets

U.S. PATENT DOCUMENTS

| | | | |
|---|---|---|---|
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,189,232 A | 2/1993 | Shabtai et al. | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,311,562 A | 5/1994 | Palusamy et al. | |
| 5,325,522 A | 6/1994 | Vaughn | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,461,570 A | 10/1995 | Wang et al. | |
| 5,483,138 A | 1/1996 | Shmookler et al. | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,499,188 A | 3/1996 | Kline, Jr. et al. | |
| 5,519,647 A | 5/1996 | DeVille | |
| 5,521,842 A | 5/1996 | Yamoda | |
| 5,533,413 A | 7/1996 | Kobayashi et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,552,984 A | 9/1996 | Crandall et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,640,491 A | 6/1997 | Bhat et al. | |
| 5,640,493 A | 6/1997 | Skeirik | |
| 5,666,297 A | 9/1997 | Britt et al. | |
| 5,675,253 A | 10/1997 | Smith et al. | |
| 5,680,409 A | 10/1997 | Qin et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,719,767 A | 2/1998 | Jang | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,764,891 A | 6/1998 | Warrior | |
| 5,768,119 A | 6/1998 | Havekost et al. | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,805,442 A | 9/1998 | Crater et al. | |
| 5,809,490 A | 9/1998 | Guiver et al. | |
| 5,817,958 A | 10/1998 | Uchida et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,842,189 A | 11/1998 | Keeler et al. | |
| 5,847,952 A | 12/1998 | Samad | |
| 5,859,773 A | 1/1999 | Keeler et al. | |
| 5,859,964 A | 1/1999 | Wang et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,960,214 A | 9/1999 | Sharpe, Jr. et al. | |
| 5,960,441 A | 9/1999 | Bland et al. | |
| 5,975,737 A | 11/1999 | Crater et al. | |
| 5,984,502 A | 11/1999 | Calder | |
| 5,988,847 A | 11/1999 | McLaughlin et al. | |
| 6,008,985 A | 12/1999 | Lake et al. | |
| 6,014,598 A | 1/2000 | Duyar et al. | |
| 6,017,143 A | 1/2000 | Eryurek et al. | |
| 6,026,352 A | 2/2000 | Burns et al. | |
| 6,033,257 A | 3/2000 | Lake et al. | |
| 6,041,263 A | 3/2000 | Boston et al. | |
| 6,047,220 A | 4/2000 | Eryurek | |
| 6,047,221 A | 4/2000 | Piche et al. | |
| 6,055,483 A | 4/2000 | Lu | |
| 6,061,603 A | 5/2000 | Papadopoulos et al. | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,102,164 A | 8/2000 | McClintock et al. | |
| 6,106,785 A | 8/2000 | Havlena et al. | |
| 6,108,616 A | 8/2000 | Borchers et al. | |
| 6,110,214 A | 8/2000 | Klimasauskas | |
| 6,119,047 A | 9/2000 | Eryurek et al. | |
| 6,122,555 A | 9/2000 | Lu | |
| 6,128,279 A | 10/2000 | O'Neil et al. | |
| 6,144,952 A | 11/2000 | Keeler et al. | |
| 6,169,980 B1 | 1/2001 | Keeler et al. | |
| 6,224,121 B1 | 5/2001 | Laubach | |
| 6,246,950 B1 | 6/2001 | Bessler et al. | |
| 6,266,726 B1 | 7/2001 | Nixon et al. | |
| 6,298,377 B1 | 10/2001 | Hartikainen et al. | |
| 6,298,454 B1 | 10/2001 | Schleiss et al. | |
| 6,317,701 B1 | 11/2001 | Pyotsia et al. | |
| 6,332,110 B1 | 12/2001 | Wolfe | |
| 6,397,114 B1 | 5/2002 | Eryurek et al. | |
| 6,421,571 B1 | 7/2002 | Spriggs et al. | |
| 6,445,963 B1 | 9/2002 | Blevins et al. | |
| 6,532,392 B1 | 3/2003 | Eryurek et al. | |
| 6,539,267 B1 | 3/2003 | Eryurek et al. | |
| 6,594,589 B1 | 7/2003 | Coss, Jr. et al. | |
| 6,609,036 B1 | 8/2003 | Bickford | |
| 6,615,090 B1 | 9/2003 | Blevins et al. | |
| 6,633,782 B1 | 10/2003 | Schleiss et al. | |
| 6,795,798 B2 * | 9/2004 | Eryurek et al. | 702/188 |
| 6,901,300 B2 | 5/2005 | Blevins et al. | |
| 7,079,984 B2 | 7/2006 | Eryurek et al. | |
| 7,085,610 B2 | 8/2006 | Eryurek et al. | |
| 7,221,988 B2 | 5/2007 | Eryurek et al. | |
| 7,233,834 B2 | 6/2007 | McDonald, Jr. et al. | |
| 7,269,599 B2 | 9/2007 | Andreev et al. | |
| 7,321,848 B2 | 1/2008 | Tuszynski | |
| 7,657,399 B2 | 2/2010 | Miller et al. | |
| 7,912,676 B2 | 3/2011 | Miller | |
| 2002/0022894 A1 | 2/2002 | Eryurek et al. | |
| 2002/0038156 A1 | 3/2002 | Eryurek et al. | |
| 2002/0077711 A1 | 6/2002 | Nixon et al. | |
| 2002/0107858 A1 | 8/2002 | Lundahl et al. | |
| 2002/0133320 A1 | 9/2002 | Wegerich et al. | |
| 2002/0147511 A1 | 10/2002 | Eryurek et al. | |
| 2002/0161940 A1 | 10/2002 | Eryurek et al. | |
| 2002/0163427 A1 | 11/2002 | Eryurek et al. | |
| 2003/0014500 A1 | 1/2003 | Schleiss et al. | |

| | | | |
|---|---|---|---|
| 2003/0074159 | A1 | 4/2003 | Bechhoefer et al. |
| 2004/0039556 | A1 | 2/2004 | Chan et al. |
| 2004/0064465 | A1 | 4/2004 | Yadav et al. |
| 2004/0078171 | A1 | 4/2004 | Wegerich et al. |
| 2004/0168108 | A1 | 8/2004 | Chan et al. |
| 2005/0060103 | A1 | 3/2005 | Chamness |
| 2005/0143873 | A1 | 6/2005 | Wilson |
| 2005/0197792 | A1 | 9/2005 | Haeuptle |
| 2005/0210337 | A1 | 9/2005 | Chester et al. |
| 2005/0246149 | A1 | 11/2005 | Tuszynski |
| 2005/0256601 | A1 | 11/2005 | Lee et al. |
| 2006/0020423 | A1 | 1/2006 | Sharpe |
| 2006/0052991 | A1 | 3/2006 | Pflugl et al. |
| 2006/0067388 | A1 | 3/2006 | Sedarat |
| 2006/0074598 | A1 | 4/2006 | Emigholz et al. |
| 2006/0157029 | A1 | 7/2006 | Suzuki et al. |
| 2006/0200549 | A1 | 9/2006 | Soto et al. |
| 2006/0265625 | A1 | 11/2006 | Dubois et al. |
| 2007/0005298 | A1 | 1/2007 | Allen et al. |
| 2007/0097873 | A1 | 5/2007 | Ma et al. |
| 2007/0109301 | A1 | 5/2007 | Smith |
| 2008/0027678 | A1 | 1/2008 | Miller |
| 2008/0052039 | A1 | 2/2008 | Miller et al. |
| 2008/0082295 | A1 | 4/2008 | Kant et al. |
| 2008/0082304 | A1 | 4/2008 | Miller |
| 2008/0082308 | A1 | 4/2008 | Kant et al. |
| 2008/0097637 | A1 | 4/2008 | Nguyen et al. |
| 2008/0116051 | A1 | 5/2008 | Miller et al. |
| 2008/0120060 | A1 | 5/2008 | Kant et al. |
| 2008/0125879 | A1 | 5/2008 | Miller |
| 2008/0167839 | A1 | 7/2008 | Miller |
| 2008/0177513 | A1 | 7/2008 | Miller |
| 2008/0208527 | A1 | 8/2008 | Kavaklioglu |
| 2009/0089009 | A1 | 4/2009 | Miller |
| 2009/0097537 | A1 | 4/2009 | Miller |

FOREIGN PATENT DOCUMENTS

| | | |
|---|---|---|
| EP | 0 626 697 A1 | 11/1994 |
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |
| GB | 2 360 357 A | 9/2001 |
| JP | 07-152714 | 6/1995 |
| WO | WO-01/79948 A1 | 10/2001 |
| WO | WO-2006/026340 | 3/2006 |
| WO | WO-2006/107933 | 10/2006 |

OTHER PUBLICATIONS

Written Opinion of the International Searching Authority for PCT/US2007/088593, mailed Jun. 16, 2008.

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://www.geindustrial.com/cwc/services?id=72 on Jul. 18, 2002.

"GE Predictor™ Services—Services Information," GE Industrial Systems, available at http://www.geindustrial.com/cwc/services?id=71 on Jul. 18, 2002.

"Predictor™ Services," GE Industrial Systems, available at http://www.geindustrial.com/cwc/services?id=74 on Jul. 18, 2002.

"Root Cause Diagnostics: Software for Diagnosing Problems in Typical Industrial Loops," Kavaklioglu et al., presented at Maintenance and Reliability Conference (MARCON 2002), Knoxville, TN, May 2002.

"Root Cause Diagnostics™ Snap-On™ Application," Emerson Process Management, available at http://www.documentation.emersonprocess.com/gaps/public/documents/data_sheets/allds04ole_ROOTCx.pdf.

U.S. Appl. No. 11/492,577, "Method and System for Detecting Abnormal Operation of a Level Regulatory Control Loop," John P. Miller, filed Jul. 25, 2006.

U.S. Appl. No. 11/492,467, "Method and System for Detecting Abnormal Operation in a Process Plant," John P. Miller, filed Jul. 25, 2006.

Ashish Mehta, et al., "Feedforward Neural Networks for Process Identification and Prediction," presented at ISA 2001, Houston, Texas, Sep. 2001.

Chiang et al., "Fault Detection and Diagnosis in Industrial Systems," pp. 70-83, Springer-Verlag London Berlin Heidelberg (2001).

Vasiliki Tzovla, et al., "Abnormal Condition Management Using Expert Systems," presented at ISA 2001, Houston, Texas, Sep. 2001.

Wernwe Kalkhoff, "Agent-Oriented Robot Task Transformation", Proceedings of the International Symposium on Intelligent Control, IEEE, pp. 242-247 (Aug. 27, 1995).

Office Action in U.S. Appl. No. 11/492,577 dated Dec. 1, 2009.

Du et al., "Automated Monitoring of Manufacturing Processes, Part 1: Monitoring Methods," *J. Engineering for Industry,* 117:121-132 (1995).

Final Office Action mailed Jun. 26, 2008 (U.S. Appl. No. 11/492,467).

Final Office Action mailed May 28, 2009 (U.S. Appl. No. 11/492,467).

Final Office Action mailed May 24, 2010 (U.S. Appl. No. 11/492,467).

Final Office Action mailed Dec. 17, 2010 (U.S. Appl. No. 11/619,846).

Hines et al., "Sensor Validation and Instrument Calibration Monitoring," University of Tennessee Maintenance and Reliability Center (2001).

Horch, "Oscillation Diagnosis in Control Loops—Stiction and Other Causes," Proceedings of the 2006 American Control Conference, Minneapolis, Minnesota, pp. 2086-2096 (2006).

International Preliminary Report on Patentability for Application No. PCT/US2007/074258, dated Jan. 27, 2009.

International Preliminary Report on Patentability for Application No. PCT/US2007/074363, dated Feb. 5, 2009.

International Preliminary Report on Patentability for Application No. PCT/US2007/088579, dated Jul. 7, 2009.

International Search Report and Written Opinion for International Application No. PCT/US2007/074258, dated Apr. 3, 2008.

International Search Report and Written Opinion for International Application No. PCT/US2007/074363, dated Dec. 20, 2007.

International Search Report and Written Opinion for International Application No. PCT/US2007/088579, dated May 26, 2008.

Montgomery, "Control Charts as a Tool in SQC (Statistical Quality Control)" Control Charts as a Tool in SQC, available at http://deming.eng.clemson.edu/pub/tutorials/qctools/ccmain1.htm on May 30, 2006.

Non-Final Office Action mailed Oct. 9, 2007 (U.S. Appl. No. 11/492,467).

Non-Final Office Action mailed Nov. 26, 2008 (U.S. Appl. No. 11/492,467).

Non-Final Office Action mailed Oct. 27, 2009 (U.S. Appl. No. 11/492,467).

Non-Final Office Action mailed Apr. 3, 2009 (U.S. Appl. No. 11/492,577).

Non-Final Office Action mailed Nov. 10, 2009 (U.S. Appl. No. 11/619,846).

Non-Final Office Action mailed Jun. 3, 2010 (U.S. Appl. No. 11/619,846).

Pettersson, "Execution Monitoring in Robotics: A Survey," *Robotics and Autonomous Systems,* 53:73-88 (2005).

Romeu, "Understanding Binomial Sequential Testing," START: Selected Topics in Assurance Related Technologies, 12(2):1-8 (2005).

Ruel, "Diagnose Loop Behavior to Find and Correct Problems with Final Control Elements, the Environment, and Upstream Systems Before You Tune the Controller," Loop Optimization, available at http://www.expertune.com/artConApr99.html on Jun. 1, 2006.

Schwarz et al., "Spectral Envelope Estimation and Representation for Sound Analysis-Synthesis," Spectral Envelope Estimation and Representation, available at http://recherche.ircam.fr/equipes/analyse-synthese/schwarz/publications/icmc1999/se99-poster.html> on May 31, 2006.

Wald, "Sequential Tests of Statistical Hypotheses," Ann. Math. Statist., 16(2):117-186 (1945).

* cited by examiner

METHOD AND SYSTEM FOR MODELING A PROCESS VARIABLE IN A PROCESS PLANT

CROSS-REFERENCES TO RELATED APPLICATIONS

This application is related to the following commonly-owned, co-pending patent application: U.S. patent application Ser. No. 11/492,467, entitled "METHOD AND SYSTEM FOR DETECTING ABNORMAL OPERATION IN A PROCESS PLANT," filed on Jul. 25, 2006. The above-referenced patent application is hereby incorporated by reference herein, in its entirety.

TECHNICAL FIELD

This disclosure relates generally to process control systems and, more particularly, to systems for modeling processes.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamps) signals to and from the process controller via an analog bus or analog lines. These 4 to 20 mA signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self calibration, identification, diagnostics, etc. A number of standard and open smart device communication protocols such as the HART®, PROFIBUS®, WORLDFIP®, Device Net®, and CAN protocols, have been developed to enable smart field devices made by different manufacturers to be used together within the same process control network. Moreover, the all digital, two wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In this case, the Fieldbus field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-integral-derivative (PID) control routine. The different function blocks within a process control system are configured to communicate with each other (e.g., over a bus) to form one or more process control loops, the individual operations of which are spread throughout the process and are, thus, decentralized.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools.

Likewise, maintenance workstations, which may be connected to the process control devices, such as field devices, via the same communication connections as the controller applications, or via different communication connections, such as OPC connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the AMS™ Suite: Intelligent Device Manager application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS™ application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, Machinery Health™ applications by CSI, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, entitled "Root Cause Diagnostics", now U.S. Pat. No. 7,085,610 (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then be sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place.

Other techniques have been developed to monitor and detect problems in a process plant. One such technique is referred to as Statistical Process Control (SPC). SPC has been used to monitor variables, such as quality variables, associated with a process and flag an operator when the quality variable is detected to have moved from its "statistical" norm. With SPC, a small sample of a variable, such as a key quality variable, is used to generate statistical data for the small sample. The statistical data for the small sample is then compared to statistical data corresponding to a much larger sample of the variable. The variable may be generated by a laboratory or analyzer, or retrieved from a data historian. SPC alarms are generated when the small sample's average or standard deviation deviates from the large sample's average or standard deviation, respectively, by some predetermined amount. An intent of SPC is to avoid making process adjustments based on normal statistical variation of the small samples. Charts of the average or standard deviation of the small samples may be displayed to the operator on a console separate from a control console.

Another technique analyzes multiple variables and is referred to as multivariable statistical process control (MSPC). This technique uses algorithms such as principal component analysis (PCA) and projections to latent structures (PLS) which analyze historical data to create a statistical model of the process. In particular, samples of variables corresponding to normal operation and samples of variables corresponding to abnormal operation are analyzed to generate a model to determine when an alarm should be generated. Once the model has been defined, variables corresponding to a current process may be provided to the model, which may generate an alarm if the variables indicate an abnormal operation.

With model-based performance monitoring system techniques, a model is utilized, such as a correlation-based model or a first-principles model, that relates process inputs to process outputs. The model may be calibrated to the actual plant operation by adjusting internal tuning constants or bias terms. The model can be used to predict when the process is moving into an abnormal region and alert the operator to take action. An alarm may be generated when there is a significant deviation in actual versus predicted behavior or when there is a big change in a calculated efficiency parameter. Model-based performance monitoring systems typically cover as small as a single unit operation (e.g. a pump, a compressor, a heater, a column, etc.) or a combination of operations that make up a process unit (e.g. crude unit, fluid catalytic cracking unit (FCCU), reformer, etc.)

SUMMARY OF THE DISCLOSURE

Example methods and systems are disclosed for creating a model for modeling behavior in a process plant. Generally speaking, a model to model at least a portion of the process plant may use M process variable data sets, where M is an integer, to determine statistical data that may be used to scale process variable data sets. The M process variable data sets are scaled and then utilized to calculate intermediate model terms. For each additional process variable data set, it is scaled using the statistical data and then utilized to update the intermediate model terms. When an adequate number of process variable data sets have been processed, the model may be calculated using the intermediate model terms. The model may be utilized, for example, for determining if the actual operation of the portion of the process plant deviates significantly from the operation predicted by the model. If there is a significant deviation, this may indicate an abnormal operation.

In one embodiment, a method for modeling behavior in a process plant comprises receiving M process variable data sets, wherein M is an integer, and calculating statistical data for process variables associated with the M process variable data sets using the M process variable data sets and not using additional process variable data sets. The method also comprises scaling the M process variable data sets using the statistical data, and calculating a plurality of intermediate modeling terms using the scaled M process variable data sets. The method additionally comprises receiving the additional process variable data sets associated with the process variables, and scaling the additional process variable data sets using the statistical data. Further, the method comprises, after calculating the plurality of intermediate modeling terms using the scaled M process variable data sets, updating the plurality of intermediate modeling terms using the scaled additional process variable data sets. Still further, the method comprises calculating a model of the process variable using the plurality of intermediate modeling terms.

In another embodiment, a system for modeling behavior in a process plant includes a memory, and a processor coupled to the memory. The processor is configured according to machine readable instructions stored in the memory to calculate statistical data for process variables associated with M process variable data sets using the M process variable data sets and not using additional process variable data sets, the M process variable data sets stored in the memory, wherein M is an integer, and scale the M process variable data sets using the statistical data. The processor is also configured according to machine readable instructions stored in the memory to calculate a plurality of intermediate modeling terms using the scaled M process variable data sets, and scale additional process variable data sets using the statistical data. The processor is additionally configured according to machine readable instructions stored in the memory to, after calculating the plurality of intermediate modeling terms using the scaled M process variable data sets, update the plurality of intermediate modeling terms using the scaled additional process variable data sets. Further, the processor is configured according to machine readable instructions stored in the memory to calculate a model of the process variable using the plurality of intermediate modeling terms.

In yet another embodiment, a tangible medium storing machine readable instructions is disclosed. The machine readable instructions are capable of causing one or more machines to calculate statistical data for process variables associated with M process variable data sets using the M process variable data sets and not using additional process variable data sets, the M process variable data sets stored in the memory, wherein M is an integer, and scale the M process variable data sets using the statistical data. Additionally, the machine readable instructions are capable of causing one or more machines to calculate a plurality of intermediate modeling terms using the scaled M process variable data sets, and scale additional process variable data sets using the statistical data. Further, the machine readable instructions are capable of causing one or more machines to after calculating the plurality of intermediate modeling terms using the scaled M process variable data sets, update the plurality of intermediate modeling terms using the scaled additional process variable data sets. Still further, the machine readable instructions are capable of causing one or more machines to calculate a model of the process variable using the plurality of intermediate modeling terms.

In still another embodiment, a system for detecting an abnormal operation in a process plant comprises a configurable model of a process in the process plant and a deviation detector coupled to the configurable model, the deviation detector configured to determine if the process significantly deviates from an output of the model. The configurable model receives M process variable data sets, wherein M is an integer, and calculates statistical data for process variables associated with the M process variable data sets using the M process variable data sets and not using additional process variable data sets. Also, the configurable model scales the M process variable data sets using the statistical data, and calculates a plurality of intermediate modeling terms using the scaled M process variable data sets. Additionally, the configurable model receives the additional process variable data sets associated with the process variables, and scales the additional process variable data sets using the statistical data. Further, the configurable model, after calculating the plurality of intermediate modeling terms using the scaled M process variable data sets, updates the plurality of intermediate modeling terms using the scaled additional process variable data sets. Still further, the configurable model calculates a model of the process variable using the plurality of intermediate modeling terms.

DETAILED DESCRIPTION

Figure 1:
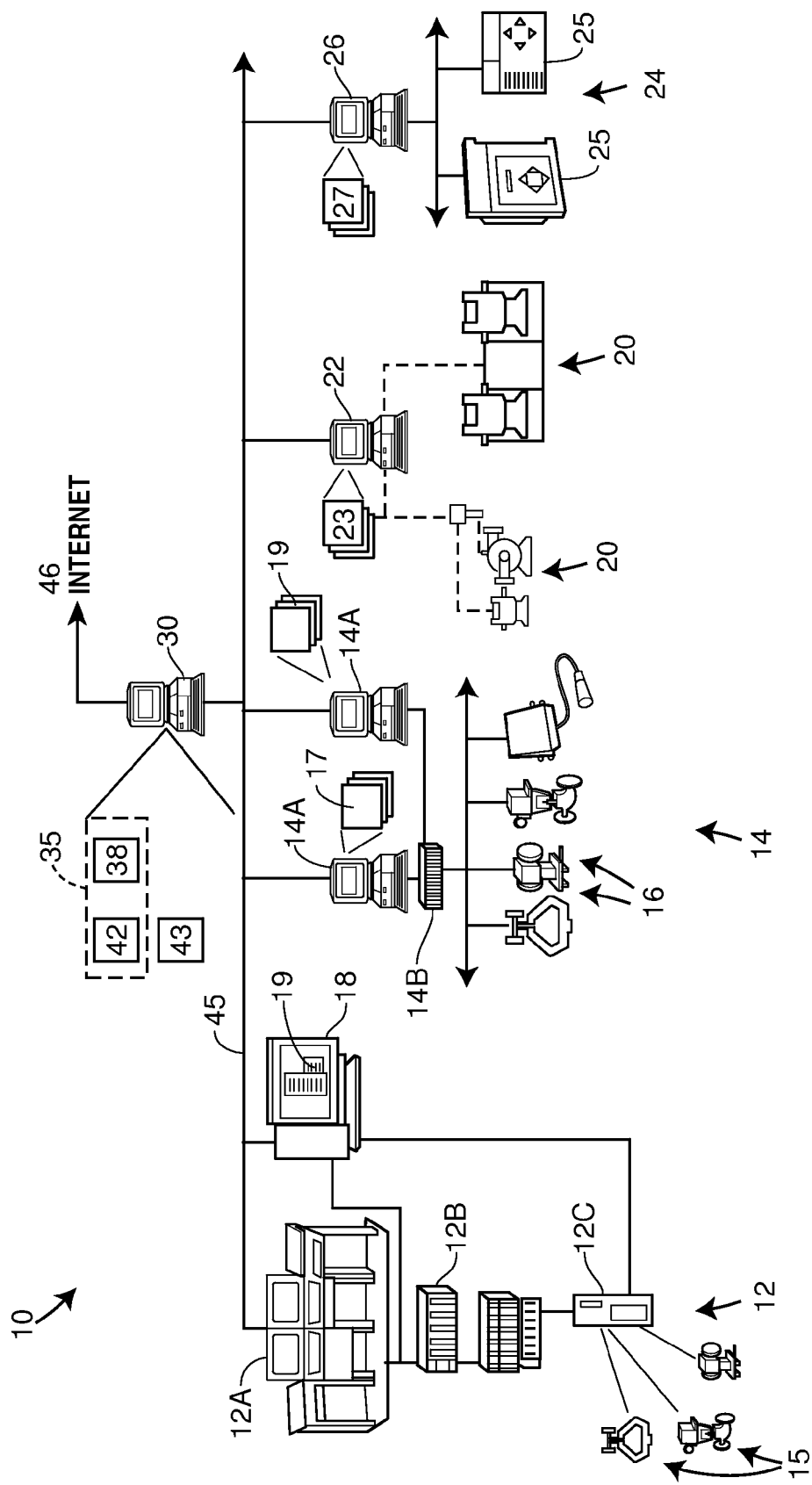
FIG. 1 is an exemplary block diagram of a process plant having a distributed control and maintenance network including one or more operator and maintenance workstations, controllers, field devices and supporting equipment.

Referring now to FIG. 1, an example process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ Suite: Intelligent Device Manager application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42, which will be described in more detail below. Additionally, the computer system 30 may implement an alert/alarm application 43.

Generally speaking, the abnormal situation prevention system 35 may communicate with abnormal operation detection systems (not shown in FIG. 1) optionally located in the field devices 15, 16, the controllers 12B, 14B, the rotating equipment 20 or its supporting computer 22, the power generation equipment 25 or its supporting computer 26, and any other desired devices and equipment within the process plant 10, and/or the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each of at least some of the computers or devices within the plant 10 or, alternatively, may be connected via any other desired communication connection including, for example, wireless connections, dedicated connections which use OPC, intermittent connections, such as ones which rely on handheld devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well.

Figure 2:
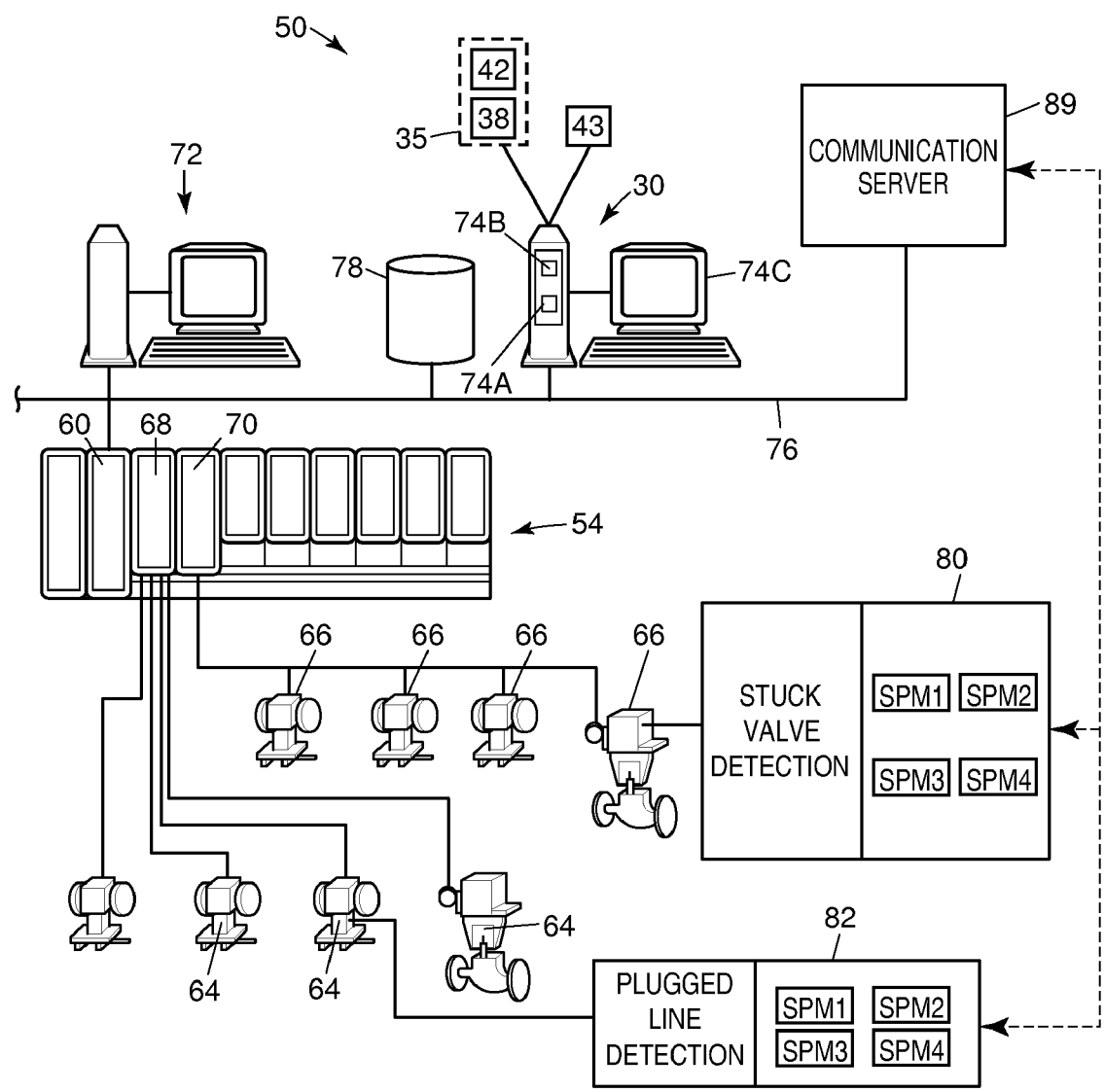
FIG. 2 is an exemplary block diagram of a portion of the process plant of FIG. 1, illustrating communication interconnections between various components of an abnormal situation prevention system located within different elements of the process plant.

FIG. 2 illustrates a portion 50 of the example process plant 10 of FIG. 1 for the purpose of describing one manner in which the abnormal situation prevention system 35 and/or the alert/alarm application 43 may communicate with various devices in the portion 50 of the example process plant 10. While FIG. 2 illustrates communications between the abnormal situation prevention system 35 and one or more abnormal operation detection systems within HART and Fieldbus field devices, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART field devices and the field devices 66 are illustrated as Fieldbus field devices, although these field devices could use any other desired communication protocols. Additionally, each of the field devices 64 and 66 may be any type of device such as, for example, a sensor, a valve, a transmitter, a positioner, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected by the field devices 64 and 66 within the process plant 10, statistical data determined from process variables collected by the field devices 64 and 66, and other types of data that will be described below.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

Each of one or more of the field devices 64 and 66 may include a memory (not shown) for storing routines such as routines for implementing statistical data collection pertaining to one or more process variables sensed by sensing device and/or routines for abnormal operation detection, which will be described below. Each of one or more of the field devices 64 and 66 may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2, some (and potentially all) of the field devices 64 and 66 include abnormal operation detection blocks 80 and 82, which will be described in more detail below. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70 or any of the devices illustrated in FIG. 1. Additionally, the blocks 80 and 82 could be in any subset of the devices 64 and 66.

Generally speaking, the blocks 80 and 82 or sub-elements of these blocks, collect data, such a process variable data, from the device in which they are located and/or from other devices. Additionally, the blocks 80 and 82 or sub-elements of these blocks may process the variable data and perform an analysis on the data for any number of reasons. For example, the block 80, which is illustrated as being associated with a valve, may have a stuck valve detection routine which analyzes the valve process variable data to determine if the valve is in a stuck condition. In addition, the block 80 may include a set of one or more statistical process monitoring (SPM) blocks or units such as blocks SPM1-SPM4 which may collect process variable or other data within the valve and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. The specific statistical data generated, nor the method in which it is generated is not critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

It is to be understood that although the blocks 80 and 82 are shown to include SPM blocks in FIG. 2, the SPM blocks may instead be stand-alone blocks separate from the blocks 80 and 82, and may be located in the same device as the corresponding block 80 or 82 or may be in a different device. The SPM blocks discussed herein may comprise known Foundation Fieldbus SPM blocks, or SPM blocks that have different or additional capabilities as compared with known Foundation Fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the Foundation Fieldbus protocol, or some other protocol, such as Profibus, HART, CAN, etc. protocol. If desired, the underlying operation of the SPM blocks may be performed or implemented at least partially as described in U.S. Pat. No. 6,017,143, which is hereby incorporated by reference herein.

It is to be understood that although the blocks 80 and 82 are shown to include SPM blocks in FIG. 2, SPM blocks are not required of the blocks 80 and 82. For example, abnormal operation detection routines of the blocks 80 and 82 could operate using process variable data not processed by an SPM block. As another example, the blocks 80 and 82 could each receive and operate on data provided by one or more SPM blocks located in other devices. As yet another example, the process variable data could be processed in a manner that is not provided by many typical SPM blocks. As just one example, the process variable data could be filtered by a finite impulse response (FIR) or infinite impulse response (IIR) filter such as a bandpass filter or some other type of filter. As another example, the process variable data could be trimmed so that it remained in a particular range. Of course, known SPM blocks could be modified to provide such different or additional processing capabilities.

The block 82 of FIG. 2, which is illustrated as being associated with a transmitter, may have a plugged line detection unit that analyzes the process variable data collected by the transmitter to determine if a line within the plant is plugged. In addition, the block 82 may includes one or more SPM blocks or units such as blocks SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting and determining statistical data. Also, the blocks 80 and 82 need not include any SPM blocks.

Overview of an Abnormal Operation Detection (AOD) System

Figure 3:
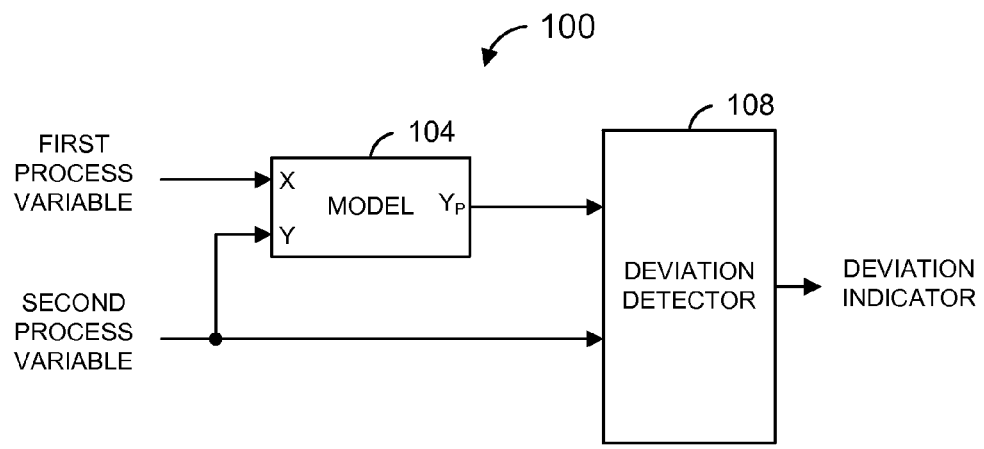
FIG. 3 is an example abnormal operation detection (AOD) system that may utilize one or more regression models.

FIG. 3 is a block diagram of an example abnormal operation detection (AOD) system 100 that could be utilized in the abnormal operation detection blocks 80 and 82 of FIG. 2. The AOD system 100 includes a model 104 that includes an independent variable X input and a dependent variable Y coupled to receive a first process variable and a second process variable, respectively. As will be described in more detail below, the model 104 may be trained using a plurality of data sets (x, y), to model the dependent variable Y as a function of the independent variable X. The model 104 may be any of a variety of models. For example, the model 104 may include a regression model that utilizes a function to model the dependent variable Y as a function of the independent variable X.

The regression model may be a linear regression model, for example, or some other regression model. Generally, a linear regression model comprises some linear combination of functions f(X), g(X), h(X), . . . For modeling an industrial process, a typically adequate linear regression model may comprise a first order function of X (e.g., $Y=a_0+a_1*X$) or a second order function of X (e.g., $Y=a_0+a_1*X+a_2*X^2$). Of course, other types of functions may be utilized as well such as higher order polynomials, sinusoidal functions, logarithmic functions, exponential functions, power functions, etc. Further, the functions may comprise functions of different samples of X (e.g., $Y(k)=a_0*X(k)+a_1*X(k-1)+a_2*X(k-2)$, $Y(k)=a_0*X(k)+a_1*X(k)^2+a_2*X(k-1)+a_3*X(k-1)^2$, etc., where k indicates the kth sample of X). Further, the functions may comprise functions of a plurality of independent variables (e.g., $Y=a_0*X_0+a_1*X_1+a_2*X_2$, $Y=a_0*X_0+a_1*X_0^2+a_2*X_1+a_3*X_1^2$, etc.).

After it has been trained, the model 104 may be used to generate a predicted value ($Y_P$) of a dependent variable Y based on a given independent variable X input. The output $Y_P$ of the model 104 is provided to a deviation detector 108. The deviation detector 108 receives the output $Y_P$ of the regression model 104 as well as the dependent variable input Y to the model 104. Generally speaking, the deviation detector 108 compares the dependent variable Y to the value $Y_P$ generated by the model 108 to determine if the dependent variable Y is significantly deviating from the predicted value $Y_P$. If the dependent variable Y is significantly deviating from the predicted value $Y_P$, this may indicate that an abnormal situation has occurred, is occurring, or may occur in the near future, and thus the deviation detector 108 may generate an indicator of the deviation. In some implementations, the indicator may comprise an alert or alarm.

One of ordinary skill in the art will recognize that the AOD system 100 can be modified in various ways. For example, process variables X and Y could be processed prior to providing them to the model 104 and/or the deviation detector 108. For instance, the process variables X and/or Y could be filtered, trimmed, etc., prior to being provided to the model 104 and/or the deviation detector 108.

Additionally, although the model 104 is illustrated as having a single independent variable input X, a single dependent variable input Y, and a single predicted value $Y_P$, the model 104 could include a regression model that models multiple variables Y as a function of multiple variables X. For example, the model 104 could comprise a multiple linear regression (MLR) model, a principal component regression (PCR) model, a partial least squares (PLS) model, a ridge regression (RR) model, a variable subset selection (VSS) model, a support vector machine (SVM) model, etc.

The AOD system 100 could be implemented wholly or partially in a field device. As just one example, the model 104 and the deviation detector 108 could be implemented in a single field device 66. As another example, the model 104 could be implemented in a field device 66 and the deviation detector 108 could be implemented in the controller 60 or some other device. In one particular implementation, the AOD system 100 could be implemented as a function block, such as a function block to be used in system that implements a Fieldbus protocol. In another implementation, the model 104 could be a first function block and the deviation detector 108 could be a second function block.

The AOD system 100 may be in communication with the abnormal situation prevention system 35 (FIGS. 1 and 2). For example, the AOD system 100 may be in communication with the configuration application 38 to permit a user to configure the AOD system 100. For instance, one or both of the model 104 and the deviation detector 108 may have user configurable parameters that may be modified via the configuration application 38.

Additionally, the AOD system 100 may provide information to the abnormal situation prevention system 35 and/or other systems in the process plant. For example, the deviation indicator generated by the deviation detector 108 could be provided to the abnormal situation prevention system 35 and/or the alert/alarm application 43 to notify an operator of the abnormal condition. As another example, after the model 104 has been trained, parameters of the model could be provided to the abnormal situation prevention system 35 and/or other systems in the process plant so that an operator can examine the model and/or so that the model parameters can be stored in a database. As yet another example, the AOD system 100 may provide X, Y, and/or $Y_P$ values to the abnormal situation prevention system 35 so that an operator can view the values, for instance, when a deviation has been detected.

Figure 4:
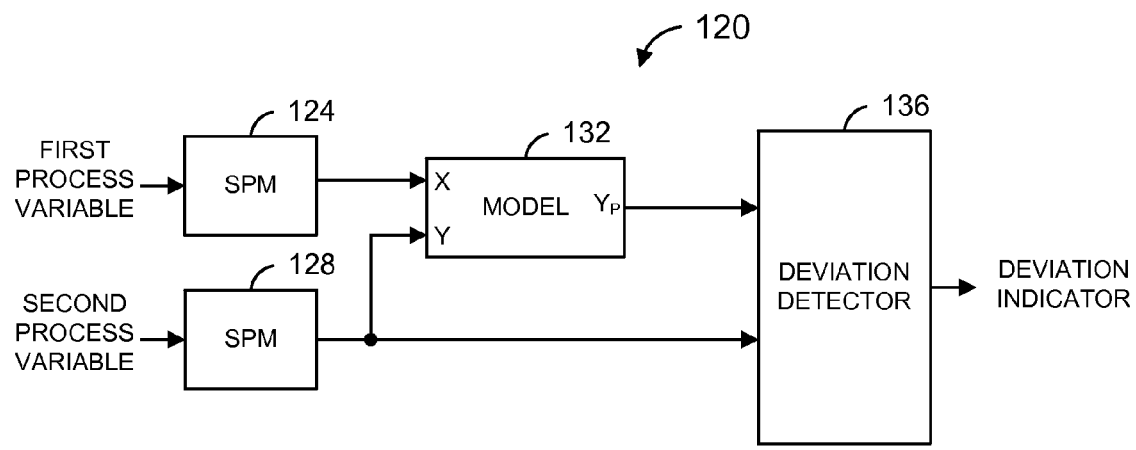
FIG. 4 is another example AOD system that utilizes one or more regression models.

FIG. 4 is a block diagram of another example abnormal operation detection (AOD) system 120 that could be utilized in the abnormal operation detection blocks 80 and 82 of FIG. 2. The AOD system 120 includes a first SPM block 124 and a second SPM block 128 coupled to a model 132. The first SPM block 124 receives a first process variable and generates first statistical data from the first process variable. The first statistical data could be any of various kinds of statistical data such as mean data, median data, standard deviation data, rate of change data, range data, etc., calculated from the first process variable. Such data could be calculated based on a sliding window of first process variable data or based on non-overlapping windows of first process variable data. As one example, the first SPM block 124 may generate mean data using a most recent first process variable sample and 49 previous samples of the first process variable. In this example, a mean variable value may be generated for each new first process variable sample received by the first SPM block 124. As another example, the first SPM block 124 may generate mean data using non-overlapping time periods. In this example, a window of five minutes (or some other suitable time period) could be used, and a mean variable value would thus be generated every five minutes. In a similar manner, the second SPM block 128 receives a second process variable and generates second statistical data from the second process variable.

The model 132 may include an independent variable X input and a dependent variable Y coupled to receive the outputs of the first SPM block 124 and the second SPM block 128, respectively. The model 132 may be the same as or similar to the model 104 described with respect to FIG. 3. The AOD system 120 may also include a deviation detector 136 that may be the same as or similar to the deviation detector 108 described with respect to FIG. 3.

One of ordinary skill in the art will recognize that the AOD system 120 can be modified in various ways. For example, the process variables X and Y could be processed prior to providing them to the first SPM block 124 and the second SPM block 128. For instance, the process variables X and/or Y could be filtered, trimmed, etc. As another example, the outputs of the first SPM block 124 and the second SPM block 128 could be processed prior to providing them to the model 132 and/or the deviation detector 136. For instance, the outputs of the first SPM block 124 and the second SPM block 128 could be filtered, trimmed, etc.

Similar to the model 104, the model 132, although illustrated as having a single independent variable input X, a single dependent variable input Y, and a single predicted value $Y_P$, could include a regression model that models multiple variables Y as a function of multiple variables X.

Similar to the AOD system 100, the AOD system 120 could be implemented wholly or partially in one or more field devices. As just one example, all of the AOD system 120 could be implemented in a single field device. As another example, the SPM block 124, the SPM block 128, and the model 132 could be implemented in a field device 66, and the deviation detector 136 could be implemented in the controller 60 or some other device. In one particular implementation, the AOD system 120 could be implemented as a function block, such as a function block to be used in a system that implements a Fieldbus protocol. In another implementation, each of the blocks 124, 128, 132, and 136 could be implemented as a separate function block.

As described above, the model 104 and the model 124 may comprise any of a variety of regression models that model one or more dependent process variables as some function of one or more independent process variables. One particular type of regression model will be described below for ease in explaining a method for calculating models. In particular, a linear regression model will be described that models a dependent process variable Y as a function of an independent variable X according to the function:

$$Y = a_0 + a_1 \cdot X + a_2 \cdot X^2 \quad \text{(Equ. 1)}$$

Figure 5:
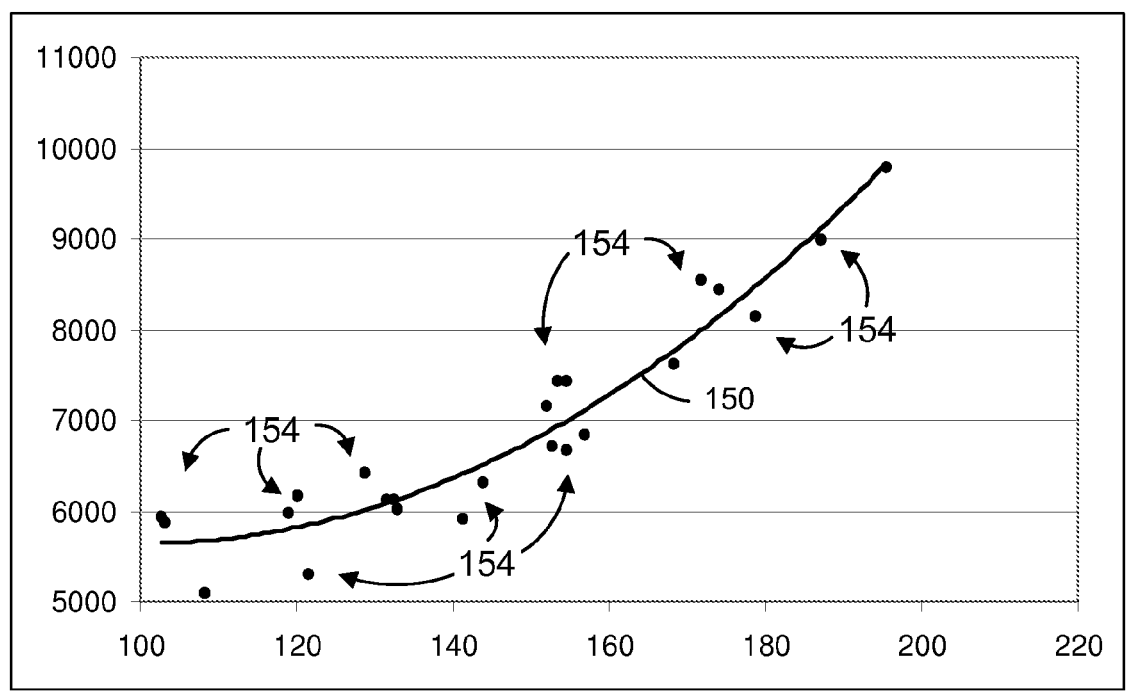
FIG. 5 is a graph illustrating a plurality of data sets and a curve corresponding to a regression model calculated using the data sets.

The model corresponding to Equation 1, generally speaking, may be calculated by processing a set of n data sets $(x_i, y_i)$ i=1, 2, ... n, to solve values of $a_0$, $a_1$, and $a_2$ that such that Equation 1 provides a best fit to the set of data sets according to some criteria. For example, the criteria could comprise minimizing the sum of the squares of the errors between the actual values of $y_i$ in the n data sets and corresponding predicted values of $y_i$ generated according to the Equation 1. FIG. 5 is a graph illustrating a curve 150 corresponding to a regression model determined for one particular set of data indicated by the points 154. The curve 150 corresponds to the equation $Y = 10394 - 94.091 \cdot X + 0.4663 \cdot X^2$.

The coefficients $a_0$, $a_1$, and $a_2$ may be calculated according to the matrix equation:

$$\begin{bmatrix} a_0 \\ a_1 \\ a_2 \end{bmatrix} = \begin{bmatrix} n & \sum_{i=1}^{n} x_i & \sum_{i=1}^{n} x_i^2 \\ \sum_{i=1}^{n} x_i & \sum_{i=1}^{n} x_i^2 & \sum_{i=1}^{n} x_i^3 \\ \sum_{i=1}^{n} x_i^2 & \sum_{i=1}^{n} x_i^3 & \sum_{i=1}^{n} x_i^4 \end{bmatrix}^{-1} \begin{bmatrix} \sum_{i=1}^{n} y_i \\ \sum_{i=1}^{n} x_i y_i \\ \sum_{i=1}^{n} x_i^2 y_i \end{bmatrix} \quad \text{(Equ. 2)}$$

The inverse of a 3×3 matrix can be determined analytically. To more concisely show the analytic formula, we define the following intermediate terms:

$$a := \sum_{i=1}^{n} x_i \quad \text{(Equ. 3a)}$$

$$b := \sum_{i=1}^{n} x_i^2 \quad \text{(Equ. 3b)}$$

$$c := \sum_{i=1}^{n} x_i^3 \quad \text{(Equ. 3c)}$$

-continued $$d := \sum_{i=1}^{n} x_i^4 \quad \text{(Equ. 3d)}$$

$$e := \sum_{i=1}^{n} y_i \quad \text{(Equ. 3e)}$$

$$f := \sum_{i=1}^{n} x_i y_i \quad \text{(Equ. 3f)}$$

$$g := \sum_{i=1}^{n} x_i^2 y_i \quad \text{(Equ. 3g)}$$

Then, Equation 2 may be rewritten as:

$$\begin{bmatrix} a_0 \\ a_1 \\ a_2 \end{bmatrix} = \begin{bmatrix} n & a & b \\ a & b & c \\ b & c & d \end{bmatrix}^{-1} \begin{bmatrix} e \\ f \\ g \end{bmatrix} \quad \text{(Equ. 4)}$$

A solution to Equation 4 is:

$$\begin{bmatrix} a_0 \\ a_1 \\ a_2 \end{bmatrix} = \frac{1}{D} \begin{bmatrix} bd - c^2 & bc - ad & ac - b^2 \\ bc - ad & nd - b^2 & ab - nc \\ ac - b^2 & ab - nc & nb - a^2 \end{bmatrix} \begin{bmatrix} e \\ f \\ g \end{bmatrix} \quad \text{(Equ. 5)}$$

$$= \frac{1}{D} \begin{bmatrix} e(bd - c^2) + f(bc - ad) + g(ac - b^2) \\ e(bc - ad) + f(nd - b^2) + g(ab - nc) \\ e(ac - b^2) + f(ab - nc) + g(nb - a^2) \end{bmatrix}$$

where:

$$D = \begin{vmatrix} n & a & b \\ a & b & c \\ b & c & d \end{vmatrix} = 2abc + nbd - a^2 d - b^3 - nc^2 \quad \text{(Equ. 6)}$$

One way to calculate the coefficients $a_0$, $a_1$, and $a_2$ comprises first storing all of the n (x, y) data sets in a memory. But this may not be desirable in some implementations, such as when memory is limited and n is a relatively a large number. As an alternative to storing all of the n (x, y) data sets in a memory, the coefficients $a_0$, $a_1$, and $a_2$ may be calculated by storing and updating the intermediate terms a, b, c, d, e, f, and g discussed above. In one implementation, when a new data point (x,y) is received, the new x component and the new y component may be used to update the intermediate terms a, b, c, d, e, f, and g, without necessarily having to store the data point (x,y) for later use. This potentially could reduce the number of memory locations by up to 2n−7. At the end of a period for collecting the data sets, the regression coefficients could be calculated using the Equations 5 and 6.

As can be seen from Equation 3a-Equation 3g, calculating the coefficients $a_0$, $a_1$, and $a_2$ comprises calculating sums of powers of x, including up to power 4. It also comprises calculating the sum of y times powers of x, up to 2. Further, as can be seen by Equations 3b, 3c, 3d, and 5, calculating the regression coefficient $a_0$ comprises adding values involving $x^6$:

$$a_0 = \frac{1}{D}\left[\left(\sum_{i=1}^{n} x_i^2 \cdot \sum_{i=1}^{n} x_i^4 - \left(\sum_{i=1}^{n} x_i^3\right)^2\right)\sum_{i=1}^{n} y_i + \ldots\right] \quad \text{(Equ. 7)}$$

Thus, one of ordinary skill in the art will recognize that, when calculating the coefficients $a_0$, $a_1$, and $a_2$ using finite computational precision and by first calculating the intermediate terms a, b, c, d, e, f, and g, and then utilizing equations 5 and 6, potentially significant errors may occur due, for example, to accumulating round-off errors. For example, calculations involving computing powers of x may lead to errors that increase as the powers and/or the values of x increase. For relatively large values of x, and/or large powers of x, the accumulating round-off errors may be significant. As a specific example, if x is approximately 10,000, then nominal values of $x^6$ are approximately $10^{24}$. For relatively large values of x, and/or large powers of x, the round-off errors may significantly accumulate. This may result in the matrix in Equation 2 becoming significantly close to singular and in the determinant D (Equations 5 and 6) becoming significantly close to zero. This, in turn, may result in a significant loss of accuracy in the computation of the coefficients $a_0$, $a_1$, and $a_2$. On the other hand, calculations involving relatively small values of x and/or relatively small powers of x, for example, may not lead to significant error.

Similar computational errors may result in computing various regression models including regression models such as MLR models, PCR models, PLS models, RR models, VSS models, SVM modes, etc. One technique for addressing computational errors is to scale the data prior to computing the regression model. In determining a regression model, scaling a variable value may comprise, for example, subtracting a mean of the variable and then dividing the variable value by the standard deviation of the variable. The mean and the standard deviation of the variable may be the mean and the standard deviation over the n data sets used to calculate the regression model. Scaling may help to significantly reduce computational errors when the data includes relatively large values and/or when computations involve relatively larger powers.

Scaling a variable value comprises processing the variable value utilizing statistical data corresponding to the variable. For example, as discussed above, scaling a variable value may comprise utilizing the mean and the standard deviation of the variable over the n data sets used to calculate the regression model. But if the mean and standard deviation are not already known, they must be calculated. One technique for calculating a regression model and for utilizing the mean and standard deviation for scaling is to first collect the n data sets. After collecting the n data sets, the mean and standard deviation may be calculated. Next, the n data sets may be scaled. Finally, the scaled n data sets may be used to calculate the model. For ease of illustration, this technique will be described with reference to the linear regression model described above that models the dependent process variable Y as a function of the independent variable X according to the function set forth in Equation 1.

First, the n data sets $(x_i, y_i)$, i=1, 2, . . . n, are collected. Then, the means of x and y ($\bar{x}$ and $\bar{y}$, respectively) and the standard deviations of x and y ($s_x$ and $s_y$, respectively) may be calculated. Next, the mean $\bar{x}$ may be subtracted from each $x_i$ in the n data sets, and the mean $\bar{y}$ may be subtracted from each $y_i$ in the n data sets. Then, each $x_i$ in the n data sets may be divided by $s_x$, and each $y_i$ in the n data sets may be divided by $s_y$. The scaled values of x and y may be referred to as $x_s$ and $y_s$:

$$x_s = \frac{x - \bar{x}}{s_x} \quad \text{(Equ. 8)}$$

$$y_s = \frac{y - \bar{y}}{s_y} \quad \text{(Equ. 9)}$$

By substituting the scaled values $x_s$ and $y_s$ for the values x and y in Equations 3a to 3g and by utilizing the following equation (adapted from Equation 5):

$$\begin{bmatrix} b_0 \\ b_1 \\ b_2 \end{bmatrix} = \frac{1}{D} \begin{bmatrix} e(bd - c^2) + f(bc - ad) + g(ac - b^2) \\ e(bc - ad) + f(nd - b^2) + g(ab - nc) \\ e(ac - b^2) + f(ab - nc) + g(nb - a^2) \end{bmatrix} \quad \text{(Equ. 10)}$$

as well as Equation 6, model coefficients $b_0$, $b_1$, and $b_2$ corresponding to the scaled n data sets may be calculated. The model according to the scaled process variables may be written as:

$$y_s = b_0 + b_1 \cdot x_s + b_2 \cdot x_s^2 \quad \text{(Equ. 11)}$$

By substituting for $x_s$ and $y_s$ using the Equations 8 and 9, and the solving for y, Equation 11 can be rewritten as:

$$y = \quad \text{(Equ. 12)}$$

$$\bar{y} + b_0 s_y - b_1 \frac{s_y \bar{x}}{s_x} + b_2 \frac{s_y \bar{x}^2}{s_x^2} + \left( b_1 \frac{s_y}{s_x} - b_2 \frac{2 s_y \bar{x}}{s_x^2} \right) x + \left( b_2 \frac{s_y}{s_x^2} \right) x^2$$

Referring to Equations 1 and 11, the coefficients $a_0$, $a_1$, and $a_2$ can be calculated from the coefficients $b_0$, $b_1$, and $b_2$ according to the equation:

$$\begin{bmatrix} a_0 \\ a_1 \\ a_2 \end{bmatrix} = \begin{bmatrix} \bar{y} & s_y & -\frac{s_y \bar{x}}{s_x} & \frac{s_y \bar{x}^2}{s_x^2} \\ 0 & 0 & \frac{s_y}{s_x} & -\frac{2 s_y \bar{x}}{s_x^2} \\ 0 & 0 & 0 & \frac{s_y}{s_x^2} \end{bmatrix} \cdot \begin{bmatrix} 1 \\ b_0 \\ b_1 \\ b_2 \end{bmatrix} \quad \text{(Equ. 13)}$$

The technique discussed above with respect to Equations 8-13 generally includes storing the n data sets $(x_i, y_i)$. As discussed previously, however, this may be problematic when n is relatively large and/or when memory resources are limited, for example.

Figure 6:
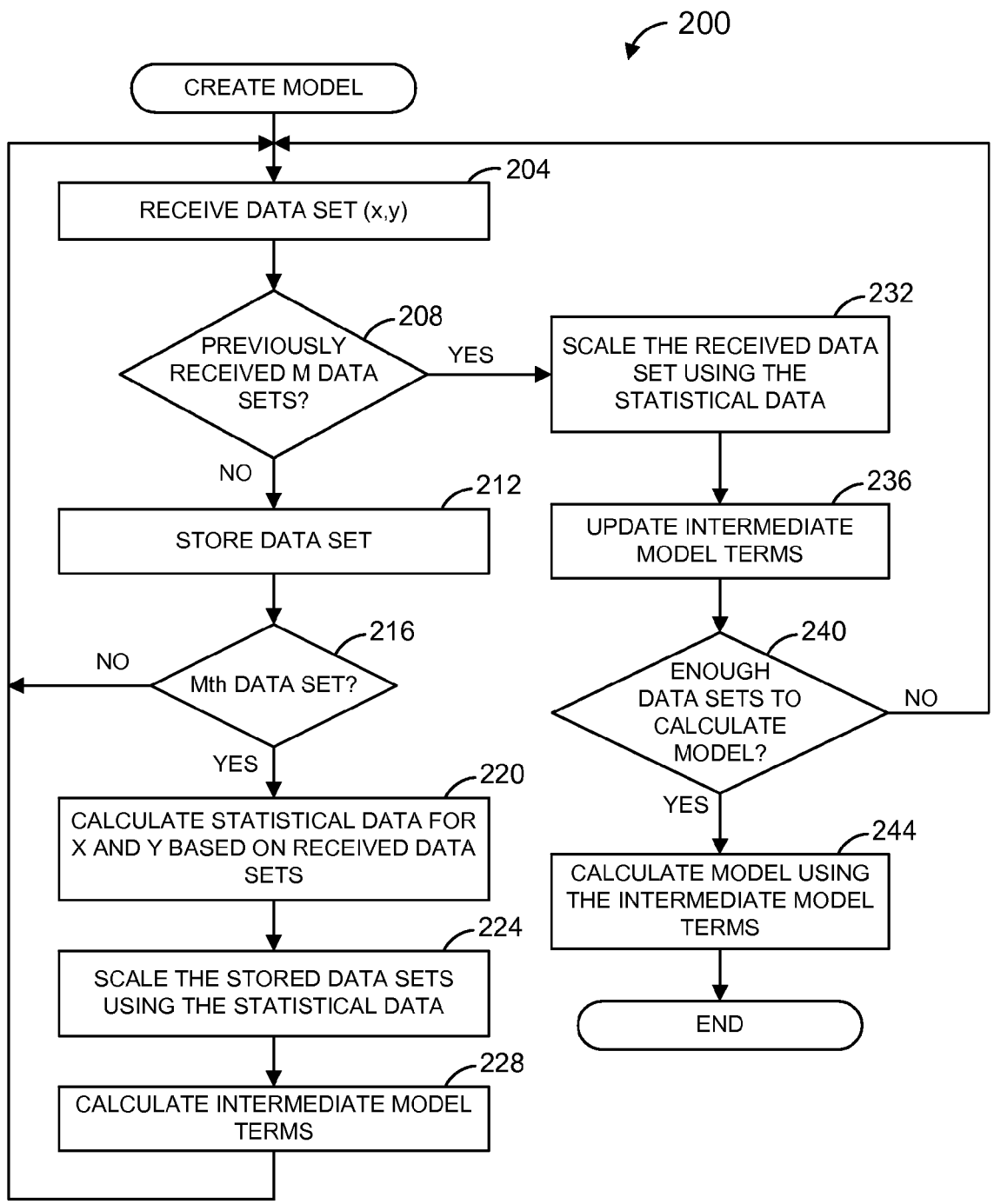
FIG. 6 is a flow diagram of an example method for calculating a model of a dependent process variable as a function of an independent variable.

FIG. 6 is a flow diagram of an example method 200 for calculating a model of a dependent process variable Y as a function of an independent variable X. Implementation of the method 200 may require less memory usage as compared to a technique such as the technique discussed above with respect to Equations 8-13. Generally speaking, in the method 200, M data sets $(x_i, y_i)$, i=1, 2, ... M, are collected, and these M data sets are used to calculate statistical data for scaling received data sets. In the example method 200, M is a positive integer assumed to be less than the number of data sets needed to calculate, or desired for calculating, the model.

At a block 204, a data set (x, y) may be received. At a block 208, it may be determined whether the Mth data set was previously received. In other words, it may be determined whether, previous to the data set just received at the block 204, the Mth data set was already received. If it is determined that the Mth data set was not previously received, the flow may proceed to a block 212. At the block 212, the data set just received at the block 204 may be stored for future usage.

At a block 216, it may be determined if the data set stored at the block 212 is the Mth data set. If it is determined that the data set stored at the block 212 is not the Mth data set, the flow may return to the block 204 at which the next data set may be received. If, however, it is determined that the data set stored at the block 212 is the Mth data set, the flow may proceed to a block 220.

At the block 220, statistical data for scaling data sets may be determined using the M stored data sets. In the linear regression example described previously, means and standard deviations were used to scale data sets. Thus, the block 220 may include determining the mean of x, the mean of y, the standard deviation of x, and the standard deviation of y over the M stored data sets. Of course, other statistical data could be calculated and used for scaling, such as a median, a variance, a range, a maximum, a minimum, a root mean square, a mean absolute deviation, etc., in addition to or instead of a mean and/or a standard deviation.

At a block 224, the M stored data sets may be scaled using the statistical data determined at the block 220. Next, at a block 228, intermediate model terms may be calculated using the data sets scaled at the block 224. In the linear regression example described previously, intermediate model terms include terms a, b, c, d, e, f, and g (Equation 3a to Equation 3g). Of course, with other types of models, other intermediate model terms may be calculated instead of or in addition to the terms a, b, c, d, e, f, and g described above. Then, the flow may proceed back to the block 204 at which the next data set may be received.

With regard to the block 208, if it is determined that the Mth data set was previously received, the flow may proceed to a block 232. Thus, the flow proceeds to the block 232 after the statistical data used to scale data sets has been determined at the block 224, and after values for the intermediate model terms have been calculated at the block 228. At the block 232, the data set just received at the block 204 may be scaled using the statistical data determined at the block 224.

At a block 236, the intermediate model terms may be updated using the data set scaled at the block 232. In the linear regression example described previously, the intermediate model terms included the terms a, b, c, d, e, f, and g (Equation 3a to Equation 3g). With regard to the term b, for example, it may be updated by first calculating the square of the scaled x component of the data set, and then adding the result to the previous value of b. The other intermediate terms a, c, d, e, f, and g may be similarly updated. Generally speaking, how intermediate terms are updated will depend on the type of model and the types of intermediate terms utilized in the model.

At a block 240, it may be determined if enough data sets have been processed to generate the model. For example, with regard to the linear regression example described previously, it may be determined if n data sets have been processed. If it is determined that enough data sets have not yet been processed, the flow may proceed back to the block 204 at which the next data set may be received. If, on the other hand, it is determined that enough data sets have been processed, the flow may proceed to a block 244.

At the block 244, the model may be calculated using the intermediate terms. In the linear regression examples described previously, the coefficients $a_0$, $a_1$, and $a_2$ may be calculated by first calculating the coefficients $b_0$, $b_1$, and $b_2$ from the intermediate model terms a, b, c, d, e, f, and g according to the Equations 10 and 6. Then, the coefficients $a_0$, $a_1$, and $a_2$ may be calculated from the coefficients $b_0$, $b_1$, and $b_2$ according to Equation 13.

Figure 7:
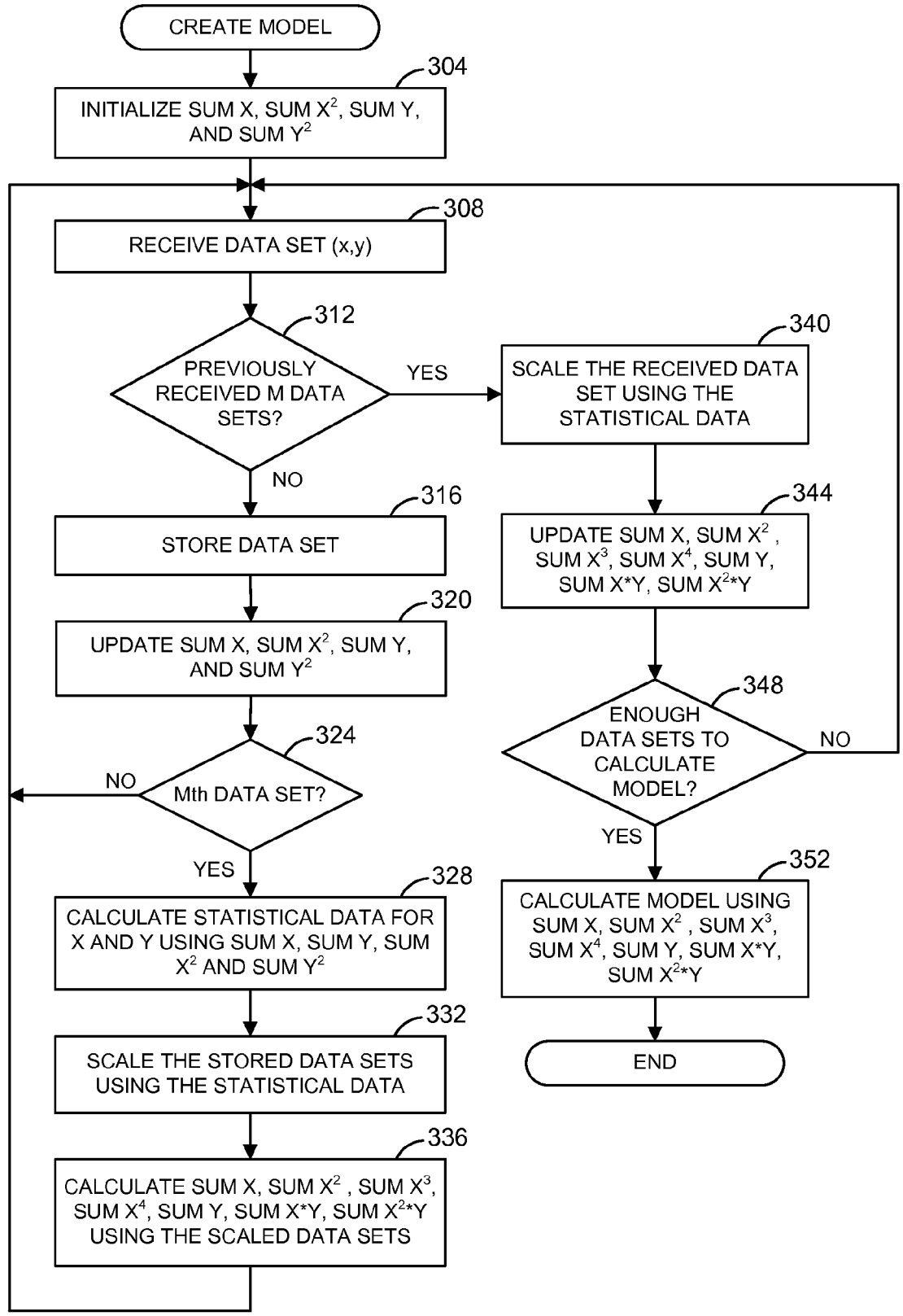
FIG. 7 is a flow diagram of an example method for implementing the method of FIG. 6.

FIG. 7 is a flow diagram of an example method 300 for calculating a model of a dependent process variable Y as a function of an independent variable X. The method 300 may be used to implement the example method 200 of FIG. 6. One of ordinary skill in the art will recognize, however, that the method 200 of FIG. 6 may be implemented in many other ways as well.

At a block 304, a plurality of variables is initialized. In particular, variables SUM X, SUM $X^2$, SUM Y, and SUM $Y^2$ are initialized to zero. As will be described below, these variables will be used to keep track of the sum of the x components of received data sets, the sum of the square of the x components, the sum of the y components of received data sets, and the sum of the square of the y components, respectively.

At a block 308, a data set (x, y) may be received. At a block 312, it may be determined whether the Mth data set was previously received. In other words, it may be determined whether, previous to the data set just received at the block 308, the Mth data set was already received. If it is determined that the Mth data set was not previously received, the flow may proceed to a block 316. At the block 316, the data set just received at the block 308 may be stored for future usage.

At a block 320, the variables SUM X, SUM $X^2$, SUM Y, and SUM $Y^2$ are updated based on the data set (x, y) received at the block 308. For example, a new value of SUM X may be calculated by adding the component x received at the block 308 to the current value of SUM X. Also, a new value of SUM $X^2$ may be calculated by squaring the component x received at the block 308 and adding it to the current value of SUM $X^2$. The values of SUM Y and SUM $Y^2$ may be updated in similar manners.

At a block 324, it may be determined if the data set stored at the block 316 is the Mth data set. If it is determined that the data set stored at the block 316 is not the Mth data set, the flow may return to the block 308 at which the next data set may be received. If, however, it is determined that the data set stored at the block 316 is the Mth data set, the flow may proceed to a block 328.

At the block 328, statistical data for scaling data sets may be determined using the values of SUM X, SUM $X^2$, SUM Y, and SUM $Y^2$. In the linear regression example described previously, means and standard deviations were used to scale data sets. Thus, the block 328 may include determining the mean of x, the mean of y, the standard deviation of x, and the standard deviation of y over the M stored data sets using the values of SUM X, SUM $X^2$, SUM Y, and SUM $Y^2$. Of course, additional statistical data also could be calculated using at least some of the values of SUM X, SUM $X^2$, SUM Y, and SUM $Y^2$ and/or using other data.

At a block 332, the M stored data sets may be scaled using the statistical data determined at the block 328. Next, at a block 336, intermediate model terms may be calculated using the data sets scaled at the block 332. In particular, intermediate model terms SUM X, SUM $X^2$, SUM $X^3$, SUM $X^4$, SUM Y, SUM X·Y, and SUM $X^2$·Y may be calculated. For example, the value of SUM X may be calculated by summing all of the scaled components x. The value of SUM $X^2$ may be calculated by summing all of the squares of the scaled components x. The value of SUM $X^3$ may be calculated by summing all of the cubes of the scaled components x. The value of SUM $X^4$ may be calculated by summing all of the fourth powers of the scaled components x. The value of SUM Y may be calculated by summing all of the scaled components y. Additionally, the value of SUM X·Y may be calculated by summing all of the products of the scaled components x and y. Additionally, the value of SUM $X^2$·Y may be calculated by summing all of the products of the squares of x with y. Other intermediate terms may be calculated as well, depending on the type of model that is to be calculated. Then, the flow may proceed back to the block 308 at which the next data set may be received.

With regard to the block 312, if it is determined that the Mth data set was previously received, the flow may proceed to a block 340. Thus, the flow proceeds to the block 340 after the statistical data used to scale data sets has been determined at the block 328, and after values for intermediate model terms have been calculated at the block 336. At the block 340, the data set just received at the block 308 may be scaled using the statistical data determined at the block 328.

At a block 344, the intermediate model terms may be updated using the data set scaled at the block 340. In particular the intermediate model terms SUM X, SUM $X^2$, SUM $X^3$, SUM $X^4$, SUM Y, SUM X·Y, and SUM $X^2$·Y may be updated in any suitable manner. If other intermediate model terms are utilized, these may be updated as well.

At a block 348, it may be determined if enough data sets have been processed to generate the model. For example, with regard to the linear regression example described previously, it may be determine if n data sets have been processed. If it is determined that enough data sets have not yet been processed, the flow may proceed back to the block 308 at which the next data set may be received. If, on the other hand, it is determined that enough data sets have been processed, the flow may proceed to a block 352.

At the block 352, the model may be calculated using the intermediate terms SUM X, SUM $X^2$, SUM $X^3$, SUM $X^4$, SUM Y, SUM X·Y, and SUM $X^2$·Y. In the linear regression examples described previously, the coefficients $a_0$, $a_1$, and $a_2$ may be calculated by first calculating the coefficients $b_0$, $b_1$, and $b_2$ from the intermediate model terms a (SUM X), b (SUM $X^2$), c (SUM $X^3$), d (SUM $X^4$), e (SUM Y), f (SUM X·Y), and g (SUM $X^2$·Y) according to the Equations 10 and 6. Then, the coefficients $a_0$, $a_1$, and $a_2$ may be calculated from the coefficients $b_0$, $b_1$, and $b_2$ according to Equation 13.

One of ordinary skill in the art will recognize that the example method 200 and the example method 300 assume that the data sets after the first M data sets have a relatively similar statistical distribution as compared to the first M data sets. In most relatively stable industrial processes this is typically the case. It is possible, however, that if the data sets after the first M data sets have significantly different statistical characteristics than the first M data sets, the example method 200 and the example method 300 may generate model coefficients of a model that does not adequately fit all of the data sets used to calculate the model coefficients.

Although the above-described example of the model 104 and the model 132 was a $2^{nd}$-order function of X, higher order models could be utilized as well. For example, a p-th order linear regression model may be utilized, where a dependent process variable Y is modeled as a function of an independent variable X according to the function:

$$Y = a_0 + a_1 \cdot X + a_2 \cdot X^2 + \ldots + a_p \cdot X^p \quad \text{(Equ. 14)}$$

The model corresponding to Equation 14, generally speaking, may be calculated by processing a set of n data sets $(x_i, y_i)$ i=1, 2, ... n, to solve values of $a_0, a_1, \ldots a_p$ that such that Equation 14 provides a best fit to the set of data sets according to some criteria. For example, the criteria could comprise minimizing the sum of the squares of the errors between the actual values of $y_i$ in the n data sets and corresponding predicted values of $y_i$ generated according to the Equation 14.

Given a set of data points $(x_i, y_i)$, for $i=1, 2, \ldots n$, the coefficients of the best-fit polynomial of order p may be calculated by the equation:

$$\begin{bmatrix} a_0 \\ a_1 \\ \ldots \\ a_p \end{bmatrix} = \begin{bmatrix} n & \sum_{i=1}^{n} x_i & \cdots & \sum_{i=1}^{n} x_i^p \\ \sum_{i=1}^{n} x_i & \sum_{i=1}^{n} x_i^2 & \cdots & \sum_{i=1}^{n} x_i^{p+1} \\ \cdots & \cdots & \cdots & \cdots \\ \sum_{i=1}^{n} x_i^p & \sum_{i=1}^{n} x_i^{p+1} & \cdots & \sum_{i=1}^{n} x_i^{2p} \end{bmatrix}^{-1} \begin{bmatrix} \sum_{i=1}^{n} y_i \\ \sum_{i=1}^{n} x_i y_i \\ \cdots \\ \sum_{i=1}^{n} x_i^p y_i \end{bmatrix} \quad \text{(Equ. 15)}$$

Estimated mean and standard deviation of X may be calculated from the first M data sets respectively by:

$$\bar{x} = \frac{1}{M} \sum_{i=1}^{M} x_i; \quad \text{and} \quad \text{(Equ. 16)}$$

$$s_x = \sqrt{\frac{\sum_{i=1}^{M} x_i^2 - \frac{1}{M}\left(\sum_{i=1}^{M} x_i\right)^2}{M-1}} \quad \text{(Equ. 17)}$$

Similarly, the mean, $\bar{y}$, and standard deviation $s_y$ may also be calculated for Y using the first M data sets.

After the means and standard deviations are calculated, the original x and y data may be scaled into a new x and y data by:

$$x_s = \frac{x - \bar{x}}{s_x}; \quad \text{and} \quad \text{(Equ. 18)}$$

$$y_s = \frac{y - \bar{y}}{s_y} \quad \text{(Equ. 19)}$$

After the x and y data have been scaled, the regression coefficients corresponding to the scaled data sets can be calculated using:

$$\begin{bmatrix} b_0 \\ b_1 \\ \ldots \\ b_p \end{bmatrix} = \begin{bmatrix} n & \sum_{i=1}^{n} x_{s,i} & \cdots & \sum_{i=1}^{n} x_{s,i}^p \\ \sum_{i=1}^{n} x_{s,i} & \sum_{i=1}^{n} x_{s,i}^2 & \cdots & \sum_{i=1}^{n} x_{s,i}^{p+1} \\ \cdots & \cdots & \cdots & \cdots \\ \sum_{i=1}^{n} x_{s,i}^p & \sum_{i=1}^{n} x_{s,i}^{p+1} & \cdots & \sum_{i=1}^{n} x_{s,i}^{2p} \end{bmatrix}^{-1} \begin{bmatrix} \sum_{i=1}^{n} y_{s,i} \\ \sum_{i=1}^{n} x_{s,i} y_{s,i} \\ \cdots \\ \sum_{i=1}^{n} x_{s,i}^p y_{s,i} \end{bmatrix} \quad \text{(Equ. 20)}$$

These regression coefficients correspond to the best fit curve for the scaled data:

$$y_s = b_0 + b_1 x_s + b_2 x_s^2 + \ldots + b_p x_s^p \quad \text{(Equ. 21)}$$

As can be seen, evaluating Equation 20 requires evaluating the inverse of a $(p+1) \times (p+1)$ matrix. Any suitable algorithm, such as Gaussian elimination, LU decomposition, etc., can be used to evaluate the inverse of the $(p+1) \times (p+1)$ matrix.

The regression coefficients $a_0, a_1, \ldots a_p$ can be calculated from the coefficients $b_0, b_1, \ldots b_p$ according to the equation:

(Equ. 22)

$$\begin{bmatrix} a_0 \\ a_1 \\ a_2 \\ a_3 \\ \ldots \\ a_p \end{bmatrix} = s_y \begin{bmatrix} \binom{0}{0} & \binom{1}{0}\frac{-\bar{x}}{s_x} & \binom{2}{0}\frac{(-\bar{x})^2}{s_x^2} & \binom{3}{0}\frac{(-\bar{x})^3}{s_x^3} & \cdots & \binom{p}{0}\frac{(-\bar{x})^p}{s_x^p} \\ 0 & \binom{1}{1}\frac{1}{s_x} & \binom{2}{1}\frac{-\bar{x}}{s_x^2} & \binom{3}{1}\frac{(-\bar{x})^2}{s_x^3} & \cdots & \binom{p}{1}\frac{(-\bar{x})^{p-1}}{s_x^p} \\ 0 & 0 & \binom{2}{2}\frac{1}{s_x^2} & \binom{3}{2}\frac{-\bar{x}}{s_x^3} & \cdots & \binom{p}{2}\frac{(-\bar{x})^{p-2}}{s_x^p} \\ 0 & 0 & 0 & \binom{3}{3}\frac{1}{s_x^3} & \cdots & \binom{p}{3}\frac{(-\bar{x})^{p-3}}{s_x^p} \\ \cdots & \cdots & \cdots & \cdots & \cdots & \\ 0 & 0 & 0 & 0 & \cdots & \binom{p}{p}\frac{1}{s_x^p} \end{bmatrix} \cdot \begin{bmatrix} b_0 \\ b_1 \\ b_2 \\ b_3 \\ \ldots \\ b_p \end{bmatrix} + \begin{bmatrix} \bar{y} \\ 0 \\ 0 \\ 0 \\ \ldots \\ 0 \end{bmatrix}$$

where $$\binom{m}{n}$$

is the Binomial coefficient, defined as $$\binom{m}{n} \equiv \frac{m!}{n!(m-n)!}.$$

The exclamation mark (!) is the factorial operation, defined as $m! \equiv 1 \times 2 \times 3 \times \ldots \times m$. By definition, $0! \equiv 1$.

Equation 22 can be rewritten as a separate equation for each coefficient:

$$a_i = s_y \sum_{j=i}^{p} \binom{j}{i} \frac{b_j(-\bar{x})^{j-i}}{s_x^j} \quad \text{(Equ. 23)}$$

for $i = 1, 2, \ldots p$; and $$a_0 = \bar{y} + s_y \sum_{j=0}^{p} \frac{b_j(-\bar{x})^j}{s_x^j} \quad \text{(Equ. 24)}$$

Similarly, the model 104 and the model 132 could be function of p different independent variables $X_1, X_2, \ldots X_p$:

$$Y = a_0 + a_1 \cdot X_1 + a_2 \cdot X_2 + \ldots + a_p \cdot X_p \quad \text{(Equ. 25)}$$

The model corresponding to Equation 25, generally speaking, may be calculated by processing a set of n data sets $(x_{i,1}, x_{i,2}, \ldots, x_{i,p}, y_i)$ $i=1, 2, \ldots n$ (where $x_{i,j}$ is the ith observation of the variable $X_j$), to solve values of $a_0, a_1, \ldots a_p$ that such that Equation 25 provides a best fit to the set of data sets according to some criteria. For example, the criteria could comprise minimizing the sum of the squares of the errors between the actual values of $y_i$ in the n data sets and corresponding predicted values of $y_i$ generated according to the Equation 25.

The ordinary least squares (OLS) solution is:

Again, if some of the x-values are large, evaluating this formula directly may result in a non-optimal solution. Therefore, an example implementation may include calculating the mean and standard deviation from the first M data sets, for each of the x-variables, as well as the y-variable, and then autoscaling future x and y data using these statistics. Estimated mean and standard deviations of the x-variables may be calculated from the first M data sets respectively by:

$$\bar{x}_j = \frac{1}{M} \sum_{i=1}^{M} x_{i,j}; \text{ and} \quad \text{(Equ. 27)}$$

$$s_{x,j} = \sqrt{\frac{\sum_{i=1}^{M} x_{i,j}^2 - \frac{1}{M}\left(\sum_{i=1}^{M} x_{i,j}\right)^2}{M-1}} \quad \text{(Equ. 28)}$$

for $j=1, 2, \ldots p$. Similarly, the mean, $\bar{y}$, and standard deviation $s_y$ may also be calculated for Y using the first M data sets.

Scaled values of each of the x-variables, as well as the y-variable, may be calculated according to the equations:

$$x_{s,j} = \frac{x_j - \bar{x}_j}{s_{x,j}} \text{ for } j = 1, 2, \ldots p, \text{ and} \quad \text{(Equ. 29)}$$

$$y_s = \frac{y - \bar{y}}{s_y} \quad \text{(Equ. 30)}$$

$$\begin{bmatrix} a_0 \\ a_1 \\ a_2 \\ a_3 \\ \vdots \\ a_p \end{bmatrix} = \begin{bmatrix} n & \sum_{i=1}^{n} x_{i,1} & \sum_{i=1}^{n} x_{i,2} & \sum_{i=1}^{n} x_{i,3} & \cdots & \sum_{i=1}^{n} x_{i,p} \\ \sum_{i=1}^{n} x_{i,1} & \sum_{i=1}^{n} x_{i,1}^2 & \sum_{i=1}^{n} x_{i,1}x_{i,2} & \sum_{i=1}^{n} x_{i,1}x_{i,3} & \cdots & \sum_{i=1}^{n} x_{i,1}x_{i,p} \\ \sum_{i=1}^{n} x_{i,2} & \sum_{i=1}^{n} x_{i,1}x_{i,2} & \sum_{i=1}^{n} x_{i,2}^2 & \sum_{i=1}^{n} x_{i,2}x_{i,3} & \cdots & \sum_{i=1}^{n} x_{i,2}x_{i,p} \\ \sum_{i=1}^{n} x_{i,3} & \sum_{i=1}^{n} x_{i,1}x_{i,3} & \sum_{i=1}^{n} x_{i,2}x_{i,3} & \sum_{i=1}^{n} x_{i,3}^2 & \cdots & \sum_{i=1}^{n} x_{i,3}x_{i,p} \\ \vdots & \vdots & \vdots & \vdots & & \vdots \\ \sum_{i=1}^{n} x_{i,p} & \sum_{i=1}^{n} x_{i,1}x_{i,p} & \sum_{i=1}^{n} x_{i,2}x_{i,p} & \sum_{i=1}^{n} x_{i,3}x_{i,p} & \cdots & \sum_{i=1}^{n} x_{i,p}^2 \end{bmatrix}^{-1} \begin{bmatrix} \sum_{i=1}^{n} y_i \\ \sum_{i=1}^{n} x_{i,1}y_i \\ \sum_{i=1}^{n} x_{i,2}y_i \\ \sum_{i=1}^{n} x_{i,3}y_i \\ \vdots \\ \sum_{i=1}^{n} x_{i,p}y_i \end{bmatrix} \quad \text{(Equ. 26)}$$

Regression coefficients corresponding to the scaled data can be computed by:

$$\begin{bmatrix} b_0 \\ b_1 \\ b_2 \\ b_3 \\ \cdots \\ b_p \end{bmatrix} = \begin{bmatrix} n & \sum_{i=1}^{n} x_{s,i,1} & \sum_{i=1}^{n} x_{s,i,2} & \sum_{i=1}^{n} x_{i,3} & \cdots & \sum_{i=1}^{n} x_{s,i,p} \\ \sum_{i=1}^{n} x_{s,i,1} & \sum_{i=1}^{n} x_{s,i,1}^2 & \sum_{i=1}^{n} x_{i,1}x_{i,2} & \sum_{i=1}^{n} x_{s,i,1}x_{s,i,3} & \cdots & \sum_{i=1}^{n} x_{s,i,1}x_{s,i,p} \\ \sum_{i=1}^{n} x_{s,i,2} & \sum_{i=1}^{n} x_{s,i,1}x_{s,i,2} & \sum_{i=1}^{n} x_{i,2}^2 & \sum_{i=1}^{n} x_{s,i,2}x_{i,3} & \cdots & \sum_{i=1}^{n} x_{s,i,2}x_{s,i,p} \\ \sum_{i=1}^{n} x_{s,i,3} & \sum_{i=1}^{n} x_{s,i,1}x_{s,i,3} & \sum_{i=1}^{n} x_{i,2}x_{i,3} & \sum_{i=1}^{n} x_{s,i,3}^2 & \cdots & \sum_{i=1}^{n} x_{s,i,3}x_{s,i,p} \\ \cdots & \cdots & \cdots & \cdots & \cdots \\ \sum_{i=1}^{n} x_{s,i,p} & \sum_{i=1}^{n} x_{s,i,1}x_{s,i,p} & \sum_{i=1}^{n} x_{i,2}x_{i,p} & \sum_{i=1}^{n} x_{s,i,3}x_{s,i,p} & \cdots & \sum_{i=1}^{n} x_{s,i,p}^2 \end{bmatrix}^{-1} \begin{bmatrix} \sum_{i=1}^{n} y_{s,i} \\ \sum_{i=1}^{n} x_{s,i,1}y_{s,i} \\ \sum_{i=1}^{n} x_{s,i,2}y_{s,i} \\ \sum_{i=1}^{n} x_{s,i,3}y_{s,i} \\ \cdots \\ \sum_{i=1}^{n} x_{s,i,p}y_{s,i} \end{bmatrix} \quad \text{(Equ. 31)}$$

where $x_{s,i,j}$ is the ith observation (data set) of the variable $X_j$, after the scaling, e.g.

$$x_{s,i,j} = \frac{x_{i,j} - \bar{x}_j}{s_{x,j}} \quad \text{(Equ. 32)}$$

Thus, the coefficients $b_0, b_1, \ldots, b_p$ are the OLS solution using the scaled data, e.g. the best-fit coefficient values for the equation:

$$y = b_0 + b_1 x_{s,1} + b_2 x_{s,2} + \ldots + b_p x_{s,p} \quad \text{(Equ. 33)}$$

By making the substitution:

$$x_{s,j} = \frac{x_j - \bar{x}_j}{s_{x,j}}; \text{ and} \quad \text{(Equ. 34)}$$

$$y_s = \frac{y - \bar{y}}{s_y} \quad \text{(Equ. 35)}$$

the regression coefficients $a_0, a_1, \ldots a_p$ can be calculated from the coefficients $b_0, b_1, \ldots b_p$ according to the equations:

$$a_j = \frac{b_j s_y}{s_{x,j}}, \text{ for } j = 1, 2, \ldots p; \text{ and} \quad \text{(Equ. 36)}$$

$$a_0 = \bar{y} + s_y \left( b_0 - \sum_{j=1}^{p} \frac{b_j \bar{x}_j}{s_{x,j}} \right) \quad \text{(Equ. 37)}$$

Examples of Implementing AOD Systems in One or More Process Plant Devices

Figure 8:
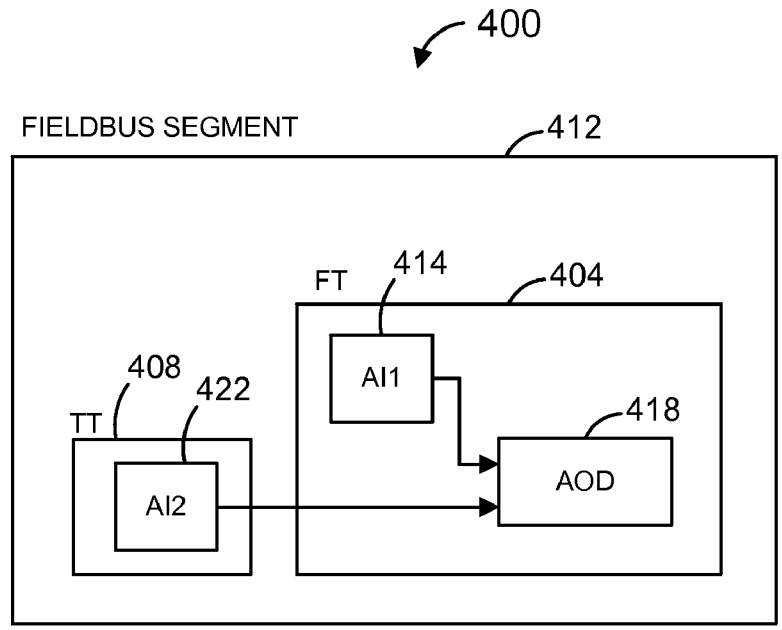
FIG. 8 is a block diagram of an example AOD system implemented on a Fieldbus segment of a process plant.

As described previously, AOD systems such as those described herein, may be implemented in a variety of devices within a process plant. FIG. 8 is a block diagram showing one possible way in which an AOD system may be implemented in a process plant. In FIG. 8, a Fieldbus system 400 includes a flow transmitter 404 and a temperature transmitter 408 on a same Fieldbus segment 412. The flow transmitter 404 may implement an analog input function block 414. Additionally, the flow transmitter 404 may implement an abnormal operation detection function block 418. The function block 418 may include at least one model and a deviation detector that function in a manner similar to that described above with respect to FIG. 3, for example. The temperature transmitter 408 may implement an analog input function block 422.

In operation, the analog input function block 414 may provide a process variable signal to the abnormal operation detection function block 418. Similarly, the analog input function block 422 may provide a process variable signal to the abnormal operation detection function block 418 via the Fieldbus segment 412.

In another implementation, the process variable signal generated by the analog input function block 414 may be provided to a first SPM block. The first SPM block may provide statistical data regarding the process variable to the abnormal operation detection function block 418 instead of or in addition to the process variable signal itself. Similarly, the process variable signal generated by the analog input function block 422 may be provided to a second SPM block, and the second SPM block may provide statistical data regarding the process variable to the abnormal operation detection function block 418 instead of or in addition to the process variable signal itself. The first SPM block may be incorporated within the analog input function block 414 or may be a separate function block implemented by the flow transmitter 404. The second SPM block may be incorporated within the analog input function block 422 or may be a separate function block implemented by the temperature transmitter 408. In another implementation, the first and second SPM blocks may be implemented by the flow transmitter 404. In this implementation, either or both of the SPM blocks could be separate functions blocks, incorporated within the analog input function block 414, or incorporated within the abnormal operation detection function block 418. In this implementation, the analog input function block 414 may provide its process variable signal to the abnormal operation detection function block 418. Similarly, the analog input function block 422 may provide its process variable signal to the abnormal operation detection function block 418 via the Fieldbus segment 412.

As is known, some field devices are capable of sensing two or more process variables. Such a field device may be capable of implementing all of blocks 414, 418 and 422.

Field devices typically have both limited memory and limited computational precision. Thus, a method such as the example methods described above may facilitate implementing and/or improved performance of an AOD system on a field device.

Figure 9:
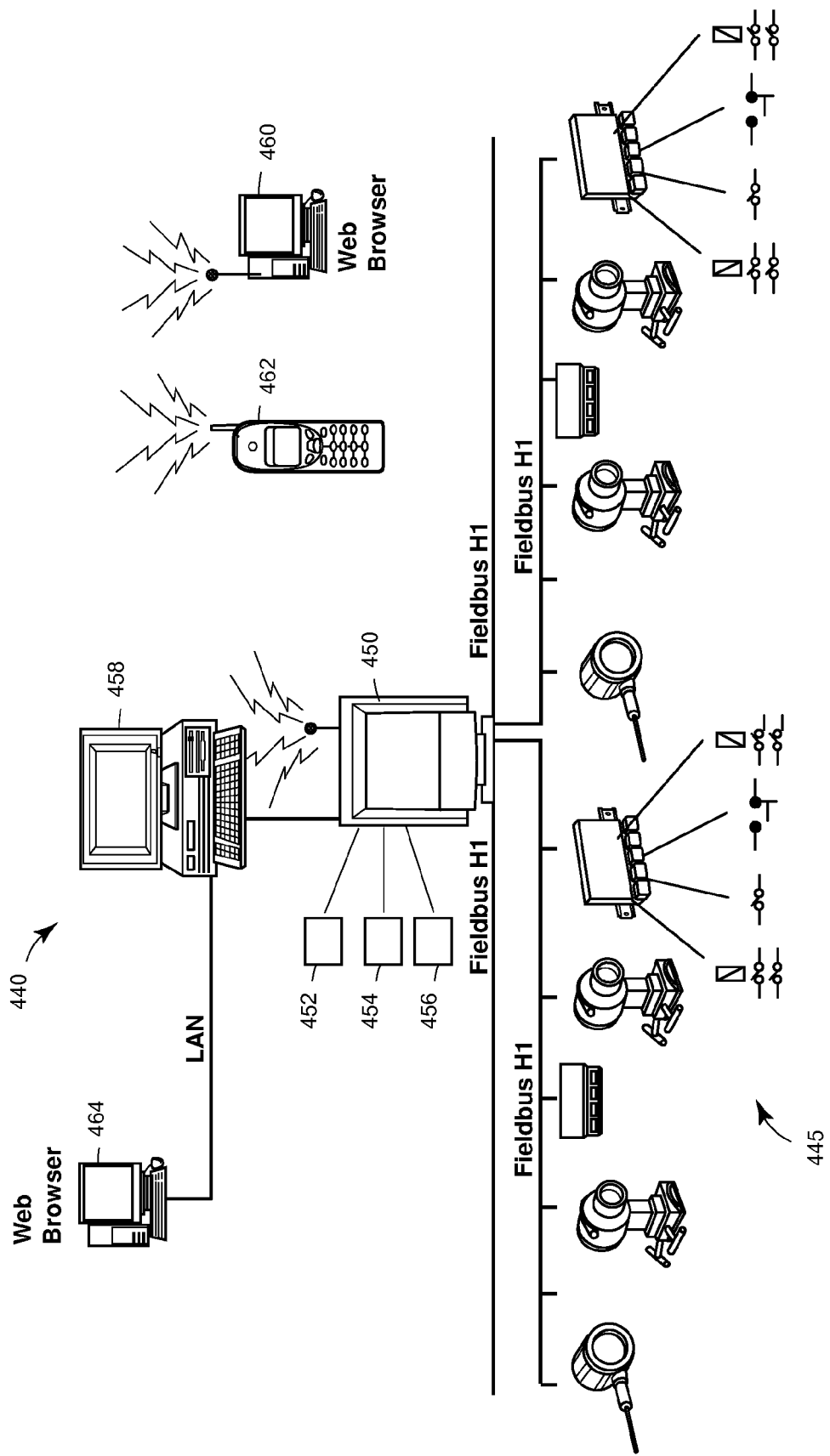
FIG. 9 is a depiction of an interface device connected within a process plant to facilitate implementation of one or more AOD systems.

FIG. 9 illustrates another manner of implementing AOD systems in a process plant. In the system 440 of FIG. 9, some or all of the abnormal situation prevention application 35, the configuration application 38, and/or the alert/alarm application 43 may be stored in a device other than a host workstation or personal computer. The example system 440 of FIG. 9 includes a set of field devices 445 (illustrated as Fieldbus field devices, but they could be other types of devices as well) connected to an interface device 450, which may be, for example, the Rosemount 3420 device. In this case, the interface device 450, which is not a personal computer, may include some or all of the functionality of the abnormal situation prevention system 35 described above. In particular, the interface device 450 may include a server application 452 to receive and organize data delivered from the field devices 445 (which may be various different types of field devices). If desired, this server application 452 may include an OPC server. The configuration application 38 (or a portion of it) may also be stored in a memory of, and executed on a processor of, the interface device 450 to allow configuration of AOD blocks, SPM blocks, detection logic, models, etc. Additionally, the interface device 450 may include one or more SPM blocks 454 therein to collect process variable data directly from one or more of the field devices (such as field devices which do not include SPM blocks or functionality) and to generate SPM parameters, as discussed above. Further, the interface device 450 may include one or more AOD blocks 456 therein to receive the process variable data and/or SPM parameters from field devices and to generate indicators of deviation, as discussed above. In this manner, the AOD blocks 456 and/or the SPM blocks 454 stored in and executed in the interface device 450 are able to compensate for the lack of AOD blocks and/or SPM blocks within certain ones of the field devices 445 and may be used to provide SPM data for field devices which do not themselves support models and deviation detectors and, optionally, SPM blocks or SPM functionality for field devices which do not themselves support AOD blocks or AOD functionality. Also, because the interface device 450 may typically have more memory and more processing power than a field device, implementing AOD blocks and/or SPM blocks in the interface device 450 may permit more complex AOD analysis to be performed. For example, more complex regression models could be implemented as compared to regression models implemented in a field device.

The interface device 450 may communicate with other devices such as a host workstation 458 via a hardwired connection, such as a 2-wire, a 3-wire, a 4-wire, etc. connection, to provide data such as alerts, alarms, SPM data, etc., to those devices for viewing by a user. Additionally, as illustrated in FIG. 9, the interface device 450 may be connected via one or more wireless communication connections to a web browser 460 and to a handheld computing device 462, such as a telephone, a personal data assistant (PDA), a laptop computer, etc. In this example, an application may be stored in and executed in other devices, such as the host workstation 458, in the web browser 460 or in the handheld computing device 462 and these applications may communicate with the interface device 450 to obtain data for the application. If desired, the devices 458, 460 and 462 may include the configuration application 38 to enable a user to configure AOD blocks and/or SPM blocks implemented in the interface device 450. Likewise, as illustrated in FIG. 9, the data from the interface device 450 may be accessed indirectly from the host 458 by a web browser 464 and provided to other users via any desired web connection. Of course, the interface device 450 may include a web server therein and may communicate with any other device, such as the devices 458, 460, 462, and 464 using any desired protocol, such as OPC, Modbus, Ethernet, HTML, XML, etc.

Figure 10:
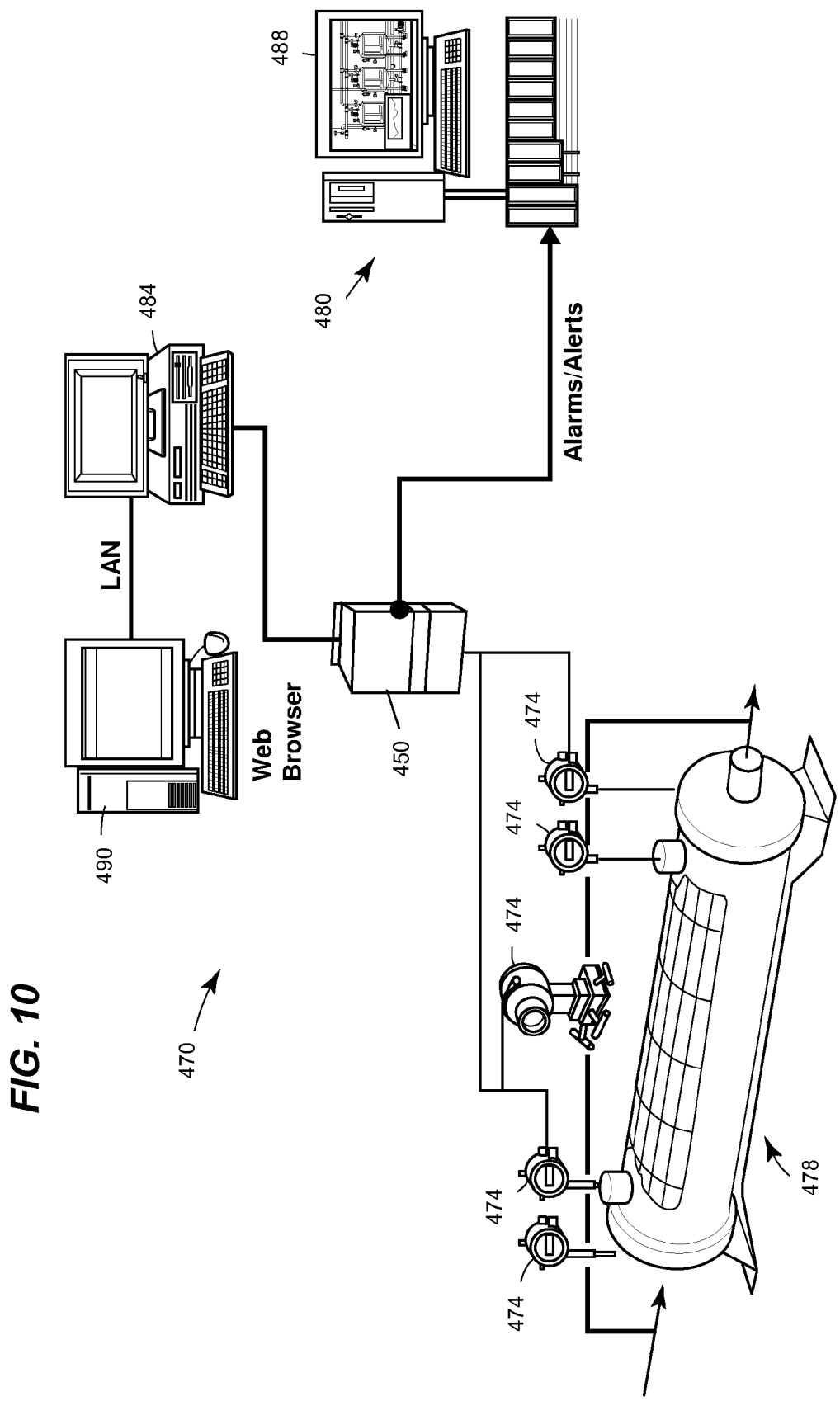
FIG. 10 is a depiction of an interface device connected within still another process plant to facilitate implementation of one or more AOD systems.

FIG. 10 illustrates a further process plant system 470 in which an interface device 450, which may be similar to or the same as that of FIG. 9, is connected between a set of field devices 474 (forming part of a heat exchanger 478) and a process controller system 480. Here, the interface device 450, which may include all of the applications and functionality of the device 450 of FIG. 9, may provide data for viewing to a host 484, and may provide alerts or alarms generated by AOD systems or other systems to the controller system 480. The controller system 480 may integrate these alerts or alarms with other controller type alerts and alarms for viewing by, for example, a control operator at an operator workstation 488. Of course, if desired, the host workstation 484 may include any desired viewing application to view the data collected in and provided by the interface device 450 in any desired manner, including any of those discussed herein. Likewise, this data may be made available for viewing by other users via a web browser 490. Thus, as will be understood, the various applications discussed herein as being associated with the abnormal situation prevention system 35, the SPM blocks (if used), and the AOD systems may be distributed in different devices. For instance, data (such as process variable data and/or SPM data) may be collected in one device, such as a field device 474, and sent to another device, such as in the interface device 450, that implements an AOD system. Alerts, alarms, or other indicators generated by the AOD system may be sent to yet another device, such as the workstation 488, for presentation to a user. Likewise, configuration information may be input via a user interface device, such as a host, a web browser, a PDA, etc. and sent to a different device, such as the interface device 450, for configuring an AOD system.

Interface devices, such as the interface device 450, tend to have more memory and computational power as compared to field devices. However, the memory of an interface is finite, and memory allocated to a particular sub-system, function block, etc., may be limited. Additionally, large values of process variables may lead to computational errors, as described above, even with the higher computational power of the interface device 450. Thus, a method such as the example methods described above may facilitate implementing and/or improved performance of an AOD system on an interface device.

Referring again to FIG. 1, AOD blocks may also be implemented by a process controller such as the controller 12B and/or the controller 14B, or by an I/O device such as the I/O cards 12C. Similarly, AOD blocks may be implemented by workstations such as the operator interface 12A, the operator interface 14A, the maintenance computer 22, the computer 26, and/or the computer system 30. In such implementations, process variable data may be transmitted from the field devices to the AOD block in the controller or the I/O device in a known manner. If the AOD block is implemented by a workstation, process variable data may be transmitted from the field devices to the AOD block via a communication network such as the network 45.

Referring again to FIG. 2, AOD blocks may also be implemented by a process controller, such as the process controller 60, and/or an I/O device such as the I/O devices 68 and 70. In such implementations, process variable data may be transmitted from the field devices to the AOD block in the controller or the I/O device in a known manner. Similarly, AOD blocks may be implemented by computers such as the computers 72 and 74. In such implementations, process variable data may be transmitted from the field devices to the AOD block in the computer via a communication network such as the network 76.

Devices such as process controllers, I/O device, workstations, etc. tend to have more memory and computational power as compared to field devices or the interface device 450 (FIGS. 9 and 10). However, the memory of such devices is finite, and memory allocated to a particular sub-system, application, function block, etc., may be limited. Additionally, large values of process variables may lead to computational errors, as described above, even with the higher computational power. Thus, a method such as the example methods described above may facilitate implementing and/or improved performance of an AOD system on process controllers, I/O device, workstations, etc.

With regard to detecting abnormal situations and/or operation, the methods described above may be used with many different types of systems and methods for detecting abnormal situations and/or operation. Particular detection systems and methods with which the above-described method may be utilized are described in U.S. patent application Ser. No. 11/492,467, entitled "METHOD AND SYSTEM FOR DETECTING ABNORMAL OPERATION IN A PROCESS PLANT," and filed on Jul. 25, 2006. U.S. patent application Ser. No. 11/492,467 is hereby incorporated by reference in its entirety. It is to be understood, however, that the detection systems and methods described in U.S. patent application Ser. No. 11/492,467 are not the only abnormal operation detection systems/methods with which the above-described techniques may be utilized.

Example abnormal operation detection techniques with which the above-described techniques may be utilized will now be described. It is to be understood, however, that these are merely examples and that other techniques may be utilized with the above-described methods and systems as well.

Figure 11:
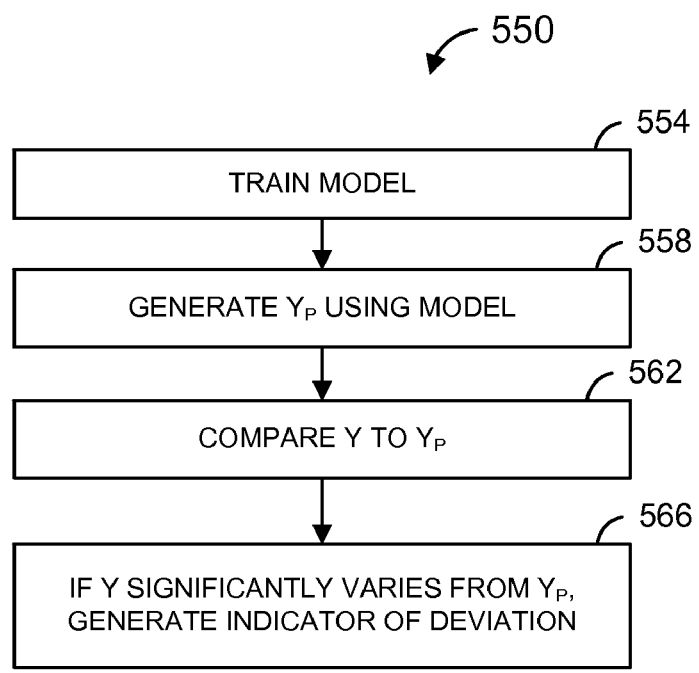
FIG. 11 is a flow diagram of an example method for using a model to detect abnormal operation in a process plant.

FIG. 11 is a flow diagram of an example method 550 for detecting an abnormal operation in a process plant. The method 550 could be implemented using the example AOD system 100 of FIG. 3 or the AOD system 120 of FIG. 4. However, one of ordinary skill in the art will recognize that the method 550 could be implemented by a system different than the AOD system 100. The method 550 will be described with reference to FIGS. 3 and 4 for ease of explanation. At a block 554, a model, such as the model 104 or the model 132 is trained. For example, the model could be trained using independent variable X and dependent variable Y data sets to configure it to model Y as a function of X. As will be described below, the model could include multiple regression models that each model Y as a function of X for a different range of X. Training the model may include performing a method such as the method 200 of FIG. 6 or the method 300 of FIG. 7, for example.

Then, at a block 558, the trained model generates predicted values ($Y_P$) of the dependent variable Y using values of the independent variable X that it receives. Next, at a block 562, the actual values of Y are compared to the corresponding predicted values $Y_P$ to determine if Y is significantly deviating from $Y_P$. For example, the deviation detector 108 or the deviation detector 136 may receive the output $Y_P$ of the model 104 or the model 132, respectively, and compare it to the dependent variable Y. If it is determined that Y has significantly deviated from $Y_P$ an indicator of the deviation may be generated at a block 566. In the AOD system 100, for example, the deviation detector 108 may generate the indicator. In the AOD system 120, for example, the deviation detector 136 may generate the indicator. The indicator may be an alert or alarm, for example, or any other type of signal, flag, message, etc., indicating that a significant deviation has been detected.

As will be discussed in more detail below, the block 554 may be repeated after the model has been initially trained and after it has generated predicted values $Y_P$ of the dependent variable Y. For example, the model could be retrained if a set point in the process has been changed.

Figure 12:
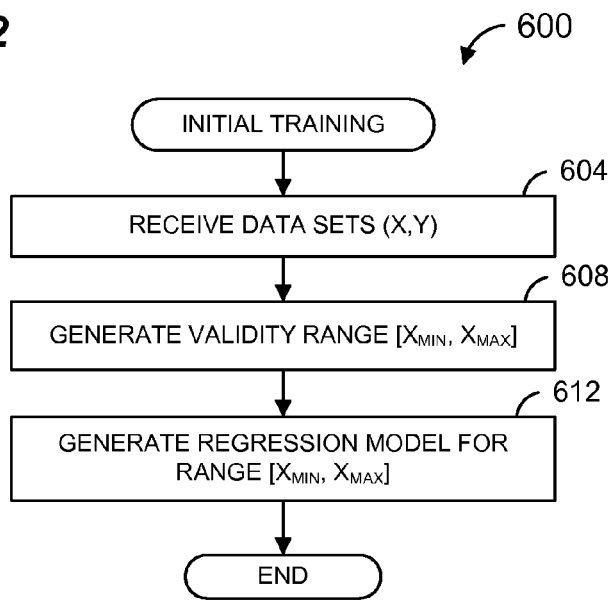
FIG. 12 is a flow diagram of an example method for initially training the model of FIG. 3 and/or the model of FIG. 4.
Figure 13A:
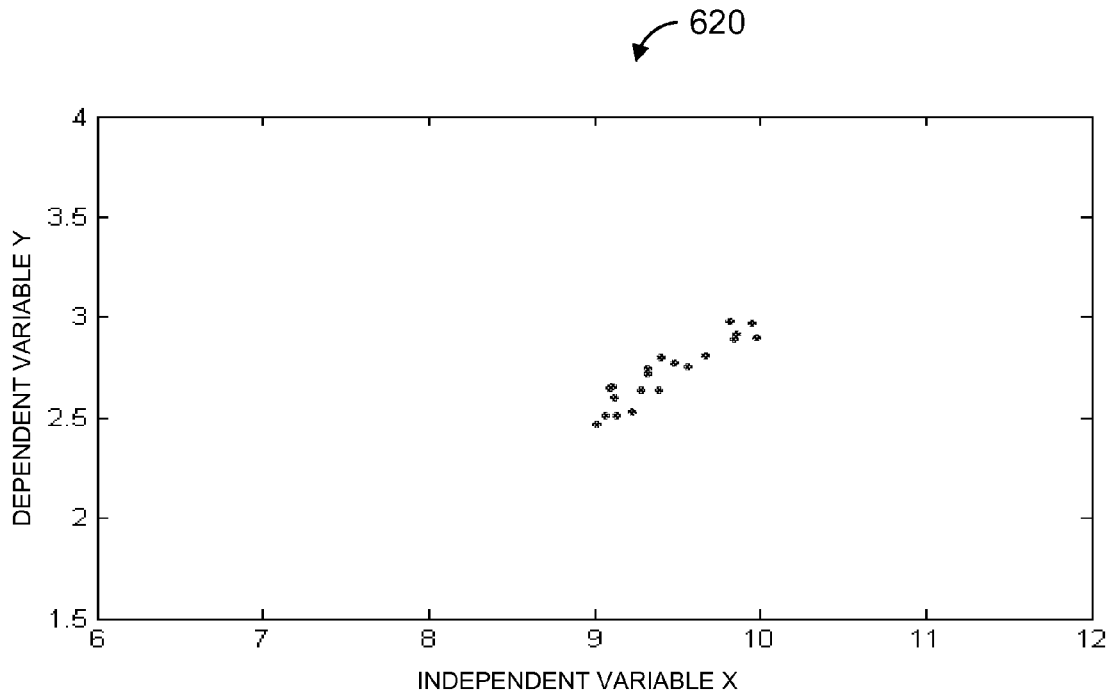
FIG. 13A is a graph showing a plurality of data sets that may be used by the model of FIG. 3 and/or the model of FIG. 4 to develop a regression model.

FIG. 12 is a flow diagram of an example method 600 for initially training a model such as the model 104 of FIG. 3 or the model 132 of FIG. 4. At a block 604, at least an adequate number of data sets (X, Y) for the independent variable X and the dependent variable Y may be received in order to train a model. As described above, the data sets (x, y) may comprise process variable data, process variable data that has been filtered or otherwise processed, statistical data generated from the process variable data, etc. In the AOD system of FIG. 4, the model 132 may receive data sets (x, y) from the SPM blocks 124 and 128. Referring now to FIG. 13A, a graph 620 shows an example of a plurality of data sets (x, y) received by a model.

Referring again to FIG. 12, at a block 608, a validity range $[X_{MIN}, X_{MAX}]$ for the model may be generated. The validity range may indicate a range of the independent variable X for which the model is valid. For instance, the validity range may indicate that the model is valid only for X values in which X is greater than or equal to $X_{MIN}$ and less than or equal to $X_{MAX}$. As just one example, $X_{MIN}$ could be set as the smallest value of X in the data sets (x, y) received at the block 604, and $X_{MAX}$ could be set as the largest value of X in the data sets (x, y) received at the block 604. Referring again to FIG. 13A, $X_{MIN}$ could be set to the X value of the leftmost data set, and $X_{MAX}$ could be set as the X value of the rightmost data set, for example. Of course, the determination of validity range could be implemented in other ways as well. In the AOD system 100 of FIG. 3, the model block 104 could generate the validity range. In the AOD system 120 of FIG. 4, the model block 132 could generate the validity range.

Figure 13B:
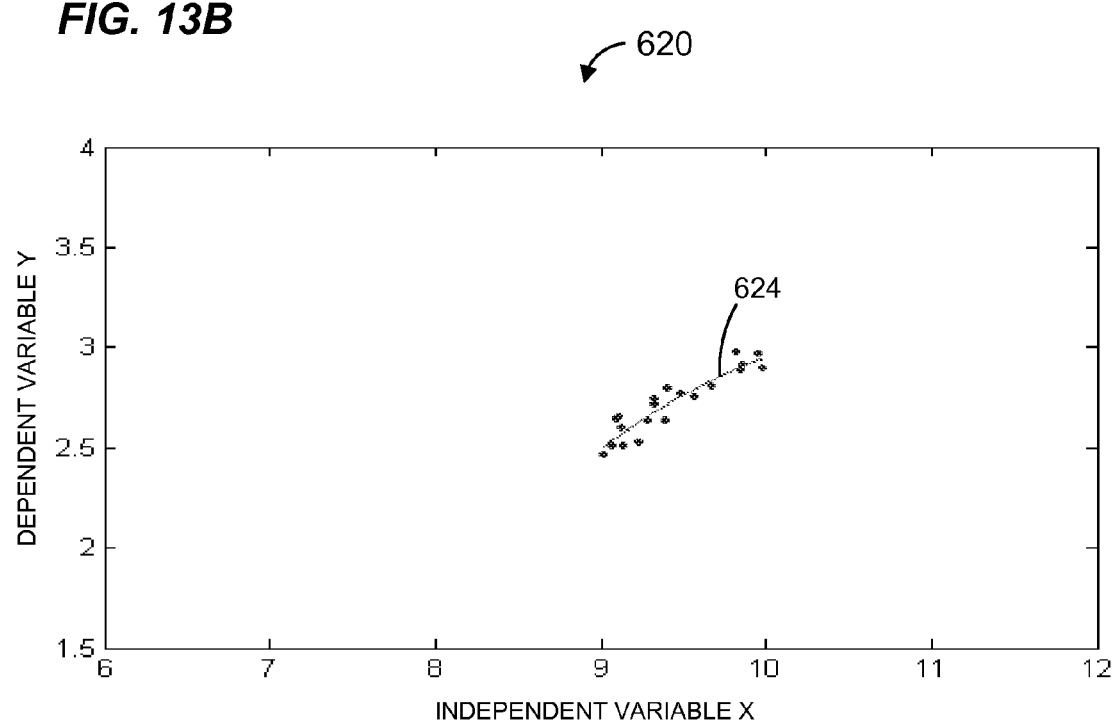
FIG. 13B is a graph showing a regression model developed using the plurality of data sets of FIG. 13A.
Figure 13C:
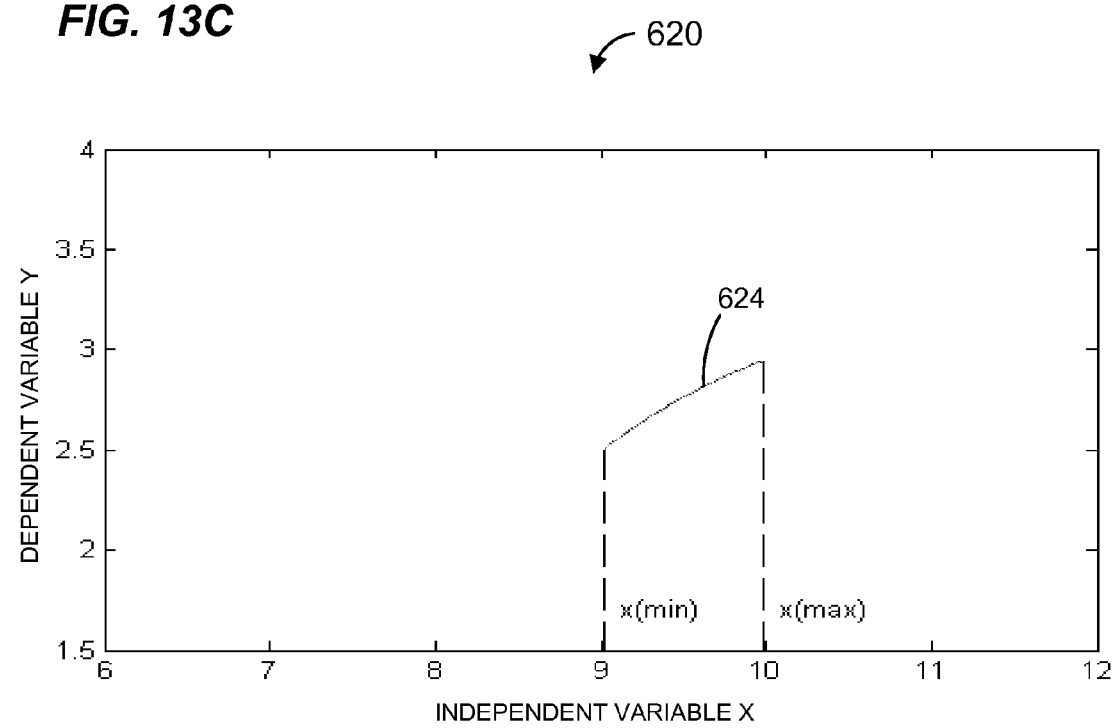
FIG. 13C is graph showing the regression model of FIG. 13B and its range of validity.

At a block 612, a regression model for the range $[X_{MIN}, X_{MAX}]$ may be generated based on the data sets (x, y) received at the block 604. Any of a variety of techniques, including known techniques, may be used to generate the regression model, and any of a variety of functions could be used as the model. Generating the regression model may comprise a method such as the method 200 of FIG. 6 or the method 300 of FIG. 7, for example. In FIG. 13B, a curve 624 superimposed on the data sets (x, y) received at the block 604 illustrates a regression model that has been generated to model the data sets (x, y). In FIG. 13C, the curve 624 is illustrated without the data sets (x, y). The regression model corresponding to the curve 624 is valid in the range $[X_{MIN}, X_{MAX}]$. In the AOD system 100 of FIG. 3, the model block 104 could generate the regression model for the range $[X_{MIN}, X_{MAX}]$. In the AOD system 120 of FIG. 4, the model block 132 could generate the regression model for the range $[X_{MIN}, X_{MAX}]$.

Utilizing the Model through Operating Region Changes

Figure 14:
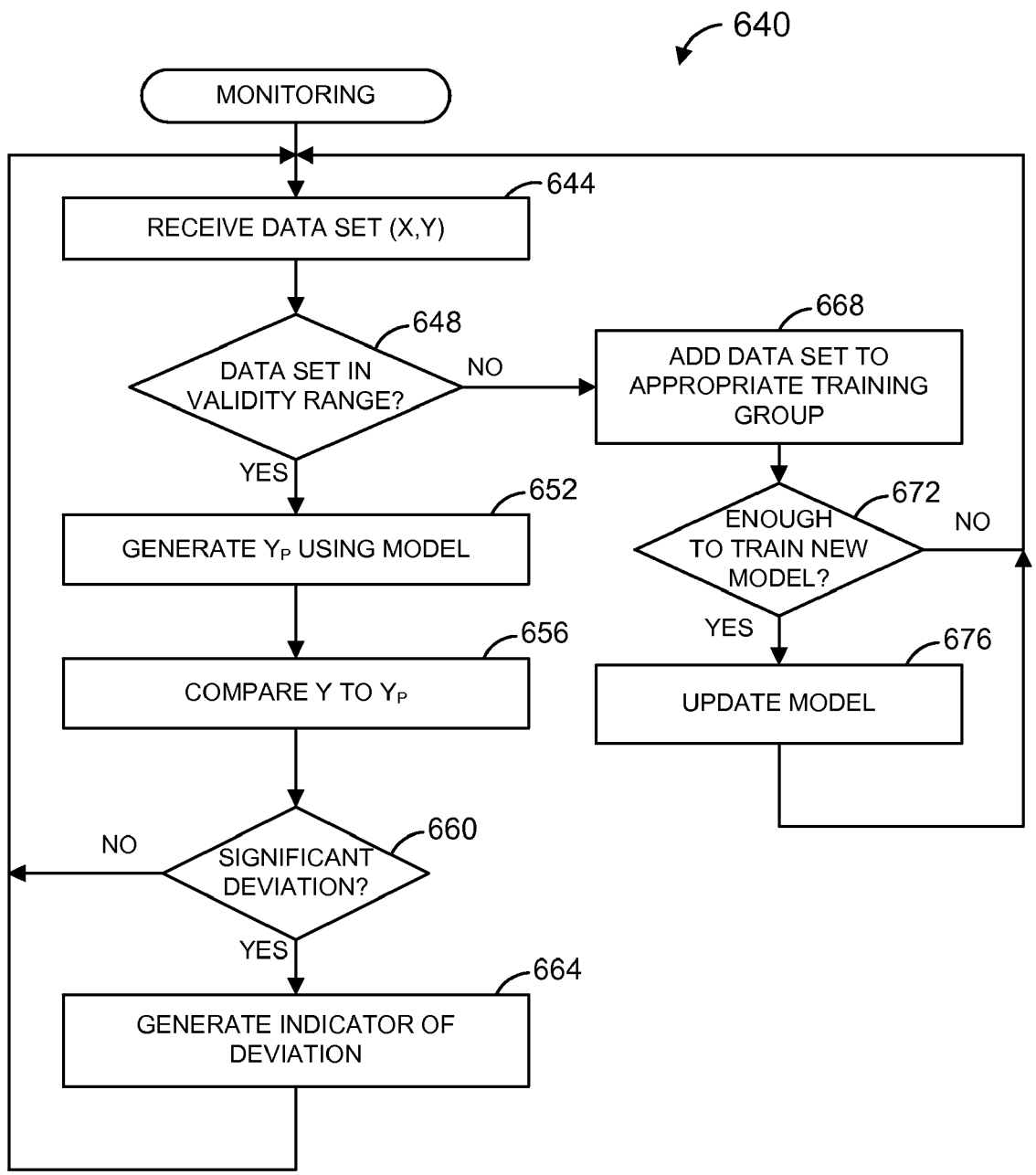
FIG. 14 is flow diagram of an example method that may be implemented using the example AOD system of FIG. 3 and/or the AOD system of FIG. 4.

It may be that, after the model has been initially trained, the system that it models may move into a different, but normal operating region. For example, a set point may be changed. FIG. 14 is a flow diagram of an example method 640 for using a model to determine whether abnormal operation is occurring, has occurred, or may occur, wherein the model may be updated if the modeled process moves into a different operating region. The method 640 may be implemented by an AOD system such as the AOD system 100 of FIG. 3 or the AOD system 120 of FIG. 4. Of course, the method 640 could be implemented by other types of AOD systems as well. The method 640 may be implemented after an initial model has been generated. The method 600 of FIG. 12, for example, could be used to generate the initial model.

At a block 644, a data set (x, y) is received. In the AOD system 120 of FIG. 4, the model 132 could receive a data set (x, y) from the SPM blocks 124 and 128, for example. Then, at a block 648, it may be determined whether the data set (x, y) received at the block 644 is in a validity range. The validity range may indicate a range in which the model is valid. In the AOD system 100 of FIG. 3, the model 104 could examine the value of x received at the block 644 to determine if it is within the validity range [$X_{MIN}$, $X_{MAX}$]. In the AOD system 120 of FIG. 4, the model 132 could examine the value of x received at the block 644 to determine if it is within the validity range [$X_{MIN}$, $X_{MAX}$]. If it is determined that the data set (x, y) received at the block 644 is in the validity range, the flow may proceed to a block 652.

At the block 652, a predicted value $Y_P$ of the dependent variable Y may be generated using the model. In particular, the model generates the predicted value $Y_P$ from the value x received at the block 644. In the AOD system 100 of FIG. 3, the model 104 generates the predicted value $Y_P$ from the received value x. In the AOD system 120 of FIG. 4, the model 132 generates the predicted value $Y_P$ from the value x received from the SPM block 124.

Figure 15A:
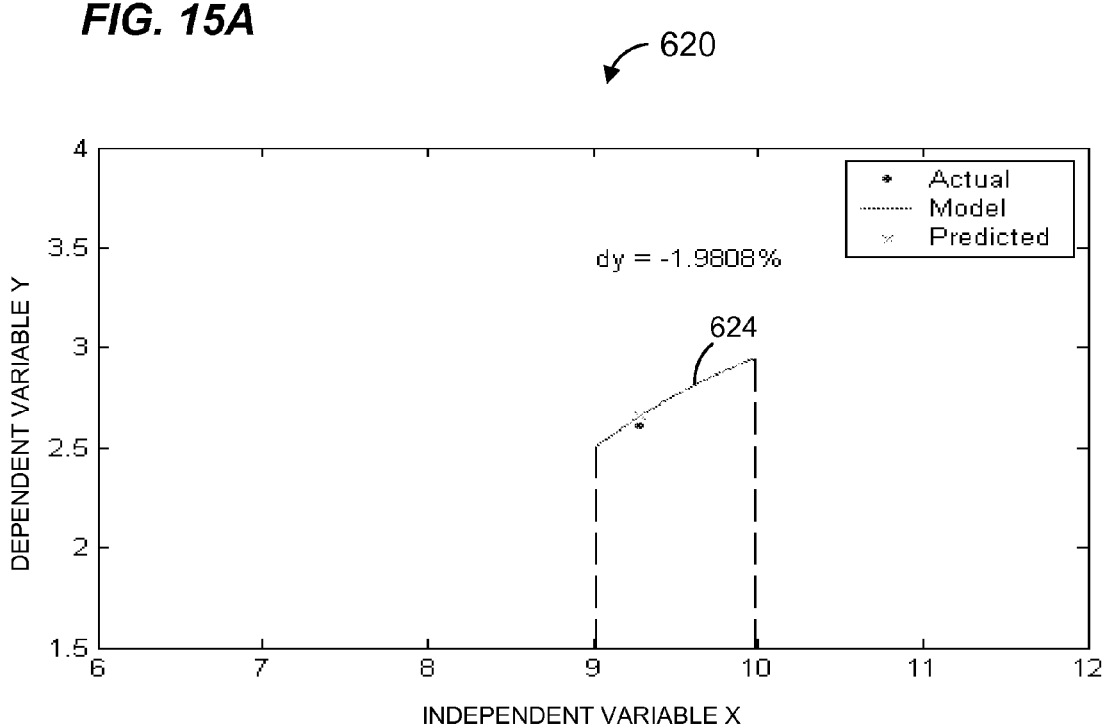
FIG. 15A is a graph showing a received data set and a corresponding predicted value generated by a model such as the model of FIG. 3 or the model of FIG. 4.
Figure 15B:
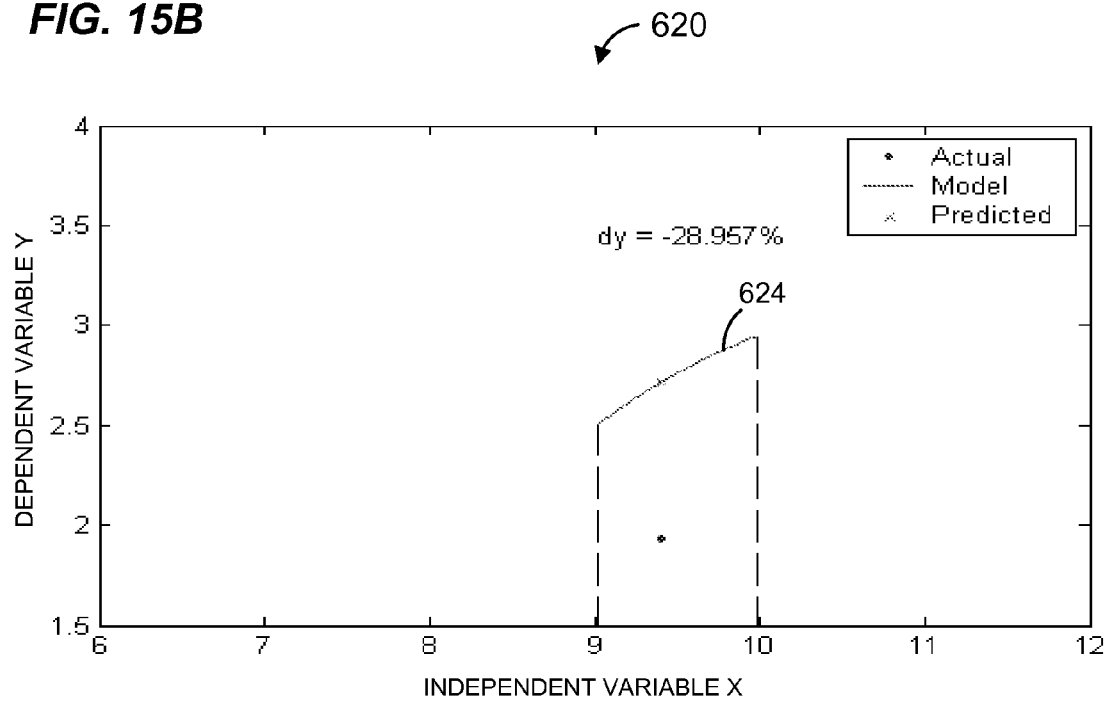
FIG. 15B is a graph showing another received data set and another corresponding predicted value generated by a model such as the model of FIG. 3 or the model of FIG. 4.

Then, at a block 656, the value y received at the block 644 may be compared with the predicted value $Y_P$. The comparison may be implemented in a variety of ways. For example, a difference or a percentage difference could be generated. Other types of comparisons could be used as well. Referring now to FIG. 15A, an example received data set is illustrated in the graph 620 as a dot, and the corresponding predicted value, $Y_P$, is illustrated as an "x". As illustrated in FIG. 15A, it has been calculated that the difference between y received at the block 644 and the predicted value $Y_P$ is $-1.9808\%$. Referring now to FIG. 15B, another example received data set is illustrated in the graph 620 as a dot, and the corresponding predicted value, $Y_P$, is illustrated as an "x". As illustrated in FIG. 15B, it has been calculated that the difference between y received at the block 644 and the predicted value $Y_P$ is $-28.957\%$. In the AOD system 100 of FIG. 3, the deviation detector 108 may perform the comparison. In the AOD system 120 of FIG. 4, the deviation detector 136 may perform the comparison.

Referring again to FIG. 14, at a block 660, it may be determined whether the value y received at the block 644 significantly deviates from the predicted value $Y_P$ based on the comparison of the block 656. The determination at the block 660 may be implemented in a variety of ways and may depend upon how the comparison of the block 656 was implemented. For example, if a difference value was generated at the block 656, it may be determined whether this difference value exceeds some threshold. The threshold may be a predetermined or configurable value. Also, the threshold may be constant or may vary. For example, the threshold may vary depending upon the value of the independent variable X value received at the block 644. As another example, if a percentage difference value was generated at the block 656, it may be determined whether this percentage value exceeds some threshold percentage. As yet another example, a significant deviation may be determined only if two or some other number of consecutive comparisons exceeds a threshold. Referring again to FIG. 15A, the difference between y received at the block 644 and the predicted value $Y_P$ is $-1.9808\%$. If, for example, a threshold of 10% is to be used to determine whether a deviation is significant, the absolute value of the difference illustrated in FIG. 15A is below that threshold Referring again to FIG. 15B on the other hand, the difference between y received at the block 644 and the predicted value $Y_P$ is $-28.957\%$. The absolute value of the difference illustrated in FIG. 15B is above the threshold value 10% so an abnormal condition indicator may be generated as will be discussed below. In the AOD system 100 of FIG. 3, the deviation detector 108 may implement the block 660. In the AOD system 120 of FIG. 4, the deviation detector 136 may implement the block 660.

In general, determining if the value y significantly deviates from the predicted value $Y_P$ may be implemented using a variety of techniques, including known techniques. For instance, determining if the value y significantly deviates from the predicted value $Y_P$ may include analyzing the present values of y and $Y_P$. For example, y could be subtracted from $Y_P$, or vice versa, and the result may be compared to a threshold to see if it exceeds the threshold. It may optionally comprise also analyzing past values of the variable Y and $Y_P$. Further, it may comprise comparing y or a difference between y and $Y_P$ to one or more thresholds. Each of the one or more thresholds may be fixed or may change. For example, a threshold may change depending on the value of X or some other variable. U.S. patent application Ser. No. 11/492,347, entitled "METHODS AND SYSTEMS FOR DETECTING DEVIATION OF A PROCESS VARIABLE FROM EXPECTED VALUES," filed on Jul. 25, 2006, and which is hereby incorporated by reference herein, describes example systems and methods for detecting whether a process variable significantly deviates from an expected value, and any of these systems and methods may optionally be utilized. One of ordinary skill in the art will recognize many other ways of determining if the value of Y significantly deviates from the predicted value $Y_P$. Further, blocks 656 and 660 may be combined.

Some or all of criteria to be used in the comparing y to $Y_P$ (block 656) and/or the criteria to be used in determining if y significantly deviates from $Y_P$ (block 660) may be configurable by a user via the configuration application 38 (FIGS. 1 and 2) for example. For instance, the type of comparison (e.g., generate difference, generate absolute value of difference, generate percentage difference, etc.) may be configurable. Also, the threshold or thresholds to be used in determining whether the deviation is significant may be configurable. Alternatively, such criteria may not be readily configurable by an operator.

Referring again to FIG. 14, if it is determined that the value y received at the block 644 does not significantly deviate from the predicted value $Y_P$, the flow may return to the block 644 to receive the next data set (x, y). If however, it is determined that the value of the variable Y does significantly deviate from the predicted value $Y_P$, the flow may proceed to the block 664. At the block 664, an indicator of a deviation may be generated. The indicator may be an alert or alarm, for example. The generated indicator may include additional information such as whether the value of the variable Y received at the block 644 was higher than expected or lower than expected, for example. Referring to FIG. 15A, because the difference between the value of the variable Y received at the block 644 and the predicted value $Y_P$ is $-1.9808\%$, which is below the threshold 10%, no indicator is generated. On the other hand, referring to FIG. 15B, the difference between the value of the variable Y received at the block 644 and the predicted value $Y_P$ is $-28.957\%$, which is above the threshold 10%. Therefore, an indicator is generated. In the AOD system 100 of FIG. 3, the deviation detector 108 may generate the indicator. In the AOD system 120 of FIG. 4, the deviation detector 136 may generate the indicator.

Referring again to the block 648 of FIG. 14, if it is determined that the data set (x, y) received at the block 644 is not in the validity range, the flow may proceed to a block 668.

Figure 16A:
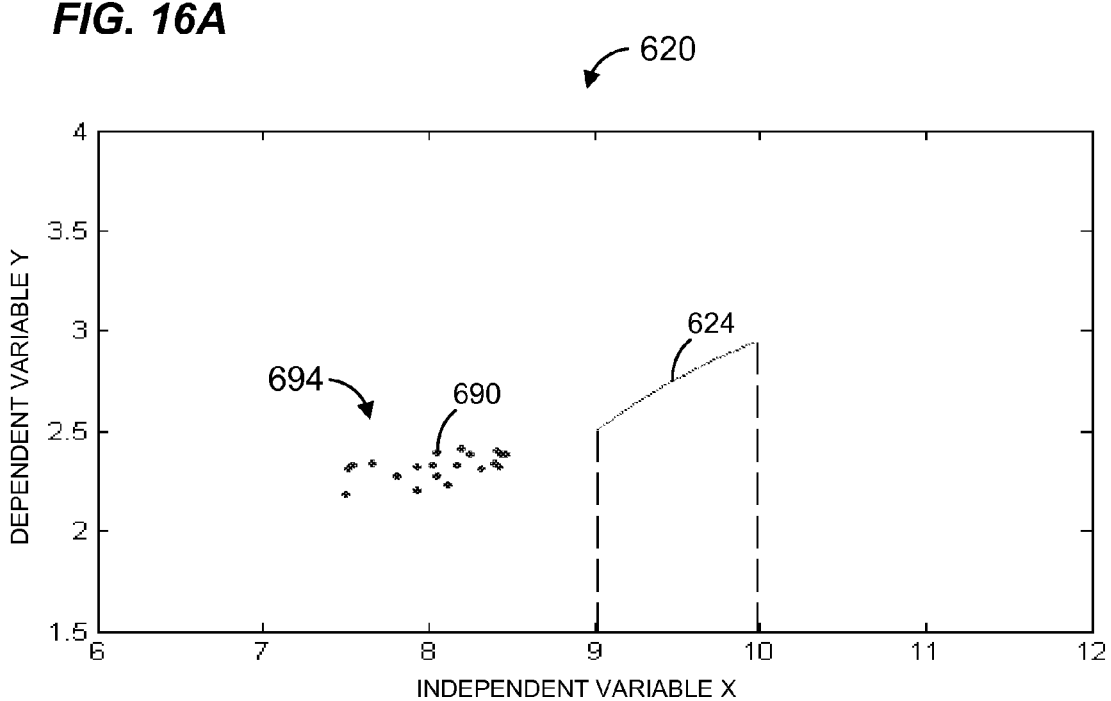
FIG. 16A is a graph showing a plurality of data sets that may be used by a model such as the model of FIG. 3 or the model of FIG. 4 to develop a second regression model in a different operating region.

Referring now to FIG. 16A, it shows a graph illustrating a received data set 690 that is not in the validity range. Referring again to FIG. 14, at the block 668, the data set (x, y) received at the block 644 may be added to an appropriate group of data sets that may be used to train the model at a subsequent time. For example, if the value of X received at the block 644 is less than $X_{MIN}$, the data set (x, y) received at the block 644 may be added to a data group corresponding to other received data sets in which the value of X is less than $X_{MIN}$. Similarly, if the value of X received at the block 644 is greater than $X_{MAX}$, the data set (x, y) received at the block 644 may be added to a data group corresponding to other received data sets in which the value of X is greater than $X_{MAX}$. Referring to FIG. 16A, the data set 690 has been added to a group of data sets 694 corresponding to data sets in which the value of X is less than $X_{MIN}$. In the AOD system 100 of FIG. 3, the model block 104 may implement the block 668. In the AOD system 120 of FIG. 4, the model block 132 may implement the block 668.

The block 668 may comprise portions of the method 200 of FIG. 6 and/or portions of the method 300 of FIG. 7. For example, the block 668 may comprise the blocks 208, 212, 216, 220, 224, 228, 232, and 236 of FIG. 6. For example, statistical data for each data group could be calculated, and data sets in a data group could be scaled using the statistical data corresponding to that data group. Also, intermediate model terms for each data group could be calculated and updated. Similarly, the block 668, may comprise the blocks 312, 316, 320, 324, 328, 332, 336, 340, and 344.

Then, at a block 672, it may be determined if enough data sets are in the data group to which the data set was added at the block 668 in order to generate a regression model corresponding to the data in that group. This determination may be implemented using a variety of techniques. For example, the number of data sets in the group may be compared to a minimum number, and if the number of data sets in the group is at least this minimum number, it may be determined that there are enough data sets in order to generate a regression model. The minimum number may be selected using a variety of techniques, including techniques known to those of ordinary skill in the art. If it is determined that there are enough data sets in order to generate a regression model, the model may be updated at a block 676, as will be described below with reference to FIG. 10. The block 676 may comprise the block 244 of FIG. 6 or the block 352 of FIG. 7, for example. If it is determined, however, that there are not enough data sets in order to generate a regression model, the flow may return to the block 644 to receive the next data set (x, y).

Figure 17:
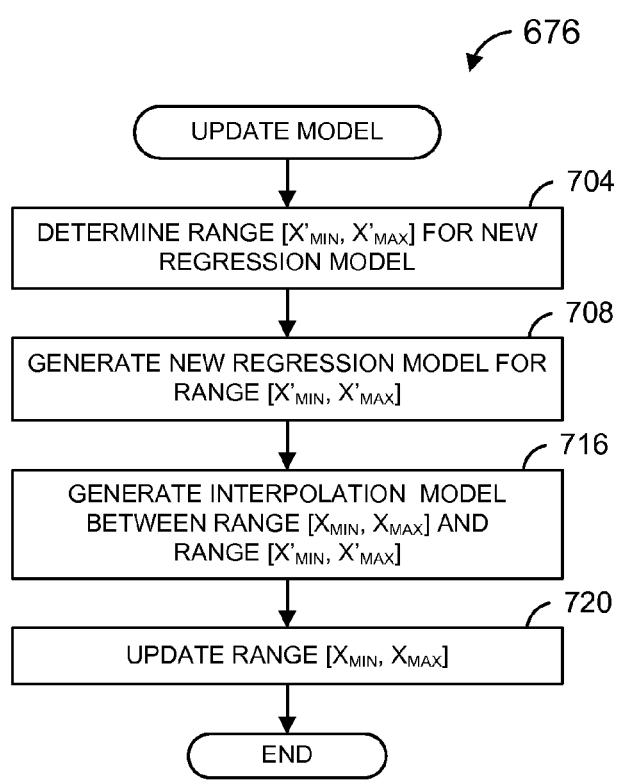
FIG. 17 is a flow diagram of an example method for updating the model of FIG. 3 and/or the model of FIG. 4.

FIG. 17 is a flow diagram of an example method 676 for updating the model after it is determined that there are enough data sets in a group in order to generate a regression model for data sets outside the current validity range $[X_{MIN}, X_{MAX}]$. At a block 704, a range $[X'_{MIN}, X'_{MAX}]$ for a new regression model may be determined. The validity range may indicate a range of the independent variable X for which the new regression model will be valid. For instance, the validity range may indicate that the model is valid only for X values in which X is greater than or equal to $X'_{MIN}$ and less than or equal to $X'_{MAX}$. As just one example, $X'_{MIN}$ could be set as the smallest value of X in the group of data sets (x, y), and $X'_{MAX}$ could be set as the largest value of X in the group of data sets (x, y). Referring again to FIG. 16A, $X'_{MIN}$ could be set to the X value of the leftmost data set in the group 694, and $X'_{MAX}$ could be set as the X value of the rightmost data set in the group 694, for example. In the AOD system 100 of FIG. 3, the model block 104 could generate the validity range. In the AOD system 120 of FIG. 4, the model block 132 could generate the validity range.

Figure 16B:
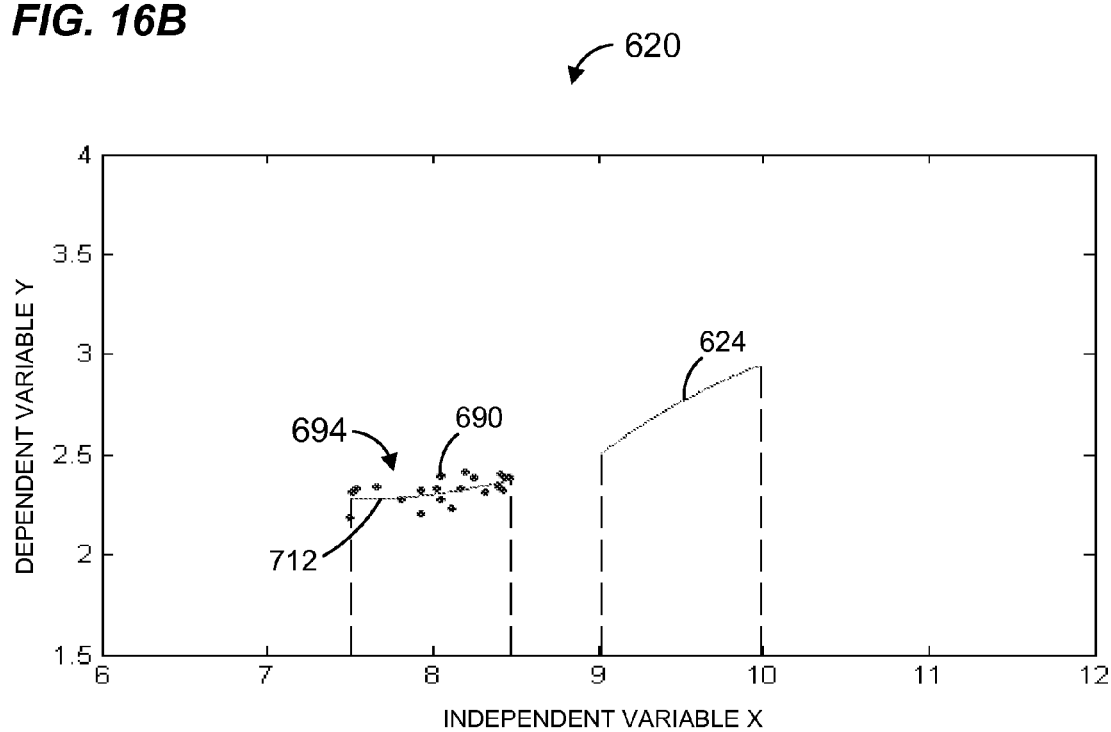
FIG. 16B is a graph showing a second regression model developed using the plurality of data sets of FIG. 16A.

At a block 708, a regression model for the range $[X'_{MIN}, X'_{MAX}]$ may be generated based on the data sets (x, y) in the group. The block 708 may comprise the block 244 of FIG. 6 or the block 352 of FIG. 7, for example. Any of a variety of techniques, including known techniques, may be used to generate the regression model, and any of a variety of functions could be used as the model. For example, the model could comprise a linear equation, a quadratic equation, etc. In FIG. 16B, a curve 712 superimposed on the group 694 illustrates a regression model that has been generated to model the data sets in the group 694. The regression model corresponding to the curve 712 is valid in the range $[X'_{MIN}, X'_{MAX}]$, and the regression model corresponding to the curve 624 is valid in the range $[X_{MIN}, X_{MAX}]$. In the AOD system 100 of FIG. 3, the model 104 could generate the regression model for the range $[X'_{MIN}, X'_{MAX}]$. In the AOD system 120 of FIG. 4, the model 132 could generate the regression model for the range $[X'_{MIN}, X'_{MAX}]$.

For ease of explanation, the range $[X_{MIN}, X_{MAX}]$ will now be referred to as $[X_{MIN\_1}, X_{MAX\_1}]$, and the range $[X'_{MIN}, X'_{MAX}]$ will now be referred to as $[X_{MIN\_2}, X_{MAX\_2}]$. Additionally, the regression model corresponding to the range $[X_{MIN\_1}, X_{MAX\_1}]$ will be referred to as $f_1(x)$, and regression model corresponding to the range $[X_{MIN\_2}, X_{MAX\_2}]$ will be referred to as $f_2(x)$. Thus, the model may now be represented as:

$$f(X) = \begin{cases} f_1(X) & \text{for } X_{MIN\_1} \leq X \leq X_{MAX\_1} \\ f_2(X) & \text{for } X_{MIN\_2} \leq X \leq X_{MAX\_2} \end{cases} \quad \text{(Equ. 38)}$$

Referring again to FIG. 17, at a block 716, an interpolation model may be generated between the regression models corresponding to the ranges $[X_{MIN\_1}, X_{MAX\_1}]$ and $[X_{MIN\_2}, X_{MAX\_2}]$. The interpolation model described below comprises a linear function, but in other implementations, other types of functions, such as a quadratic function, can be used. If $X_{MAX\_1}$ is less than $X_{MIN\_2}$, then the interpolation model may be calculated as:

$$\left(\frac{f_2(X_{MIN\_2}) - f_1(X_{MAX\_1})}{X_{MIN\_2} - X_{MAX\_1}}\right)(X - X_{MIN\_2}) + f_2(X_{MIN\_2}) \quad \text{(Equ. 39)}$$

Similarly, if $X_{MAX\_2}$ is less than $X_{MIN\_1}$, then the interpolation model may be calculated as:

$$\left(\frac{f_1(X_{MIN\_1}) - f_1(X_{MAX\_2})}{X_{MIN\_2} - X_{MAX\_2}}\right)(X - X_{MIN\_1}) + f_1(X_{MIN\_1}) \quad \text{(Equ. 40)}$$

Thus, the model may now be represented as:

$$f(X) = \begin{cases} f_1(X) & \text{for } X_{MIN\_1} \leq X \leq X_{MAX\_1} \\ \left(\dfrac{f_2(X_{MIN\_2}) - f_1(X_{MAX\_1})}{X_{MIN\_2} - X_{MAX\_1}}\right)(X - X_{MIN\_2}) + f_2(X_{MIN\_2}) & \text{for } X_{MAX\_1} < X < X_{MIN\_2} \\ f_2(X) & \text{for } X_{MIN\_2} \leq X \leq X_{MAX\_2} \end{cases} \quad \text{(Equ. 41)}$$

if $X_{MAX\_1}$ is less than $X_{MIN\_2}$. And, if $X_{MAX\_2}$ is less than $X_{MIN\_1}$, the interpolation model may be represented as:

$$f(X) = \begin{cases} f_2(X) & \text{for } X_{MIN\_2} \leq X \leq X_{MAX\_2} \\ \left(\dfrac{f_1(X_{MIN\_1}) - f_2(X_{MAX\_2})}{X_{MIN\_1} - X_{MAX\_2}}\right)(X - X_{MIN\_1}) + f_1(X_{MIN\_1}) & \text{for } X_{MAX\_2} < X < X_{MIN\_1} \\ f_1(X) & \text{for } X_{MIN\_1} \leq X \leq X_{MAX\_1} \end{cases} \quad \text{(Equ. 42)}$$

As can be seen from equations 38, 41 and 42, the model may comprise a plurality of regression models. In particular, a first regression model (i.e., $f_1(X)$) may be used to model the dependent variable Y in a first operating region (i.e., $X_{MIN\_1} \leq X \leq X_{MAX\_1}$), and a second regression model (i.e., $f_2(X)$) may be used to model the dependent variable Y in a second operating region (i.e., $X_{MIN\_2} \leq X \leq X_{MAX\_2}$). Additionally, as can be seen from equations 41 and 42, the model may also comprise an interpolation model to model the dependent variable Y in between operating regions corresponding to the regression models.

Figure 16C:
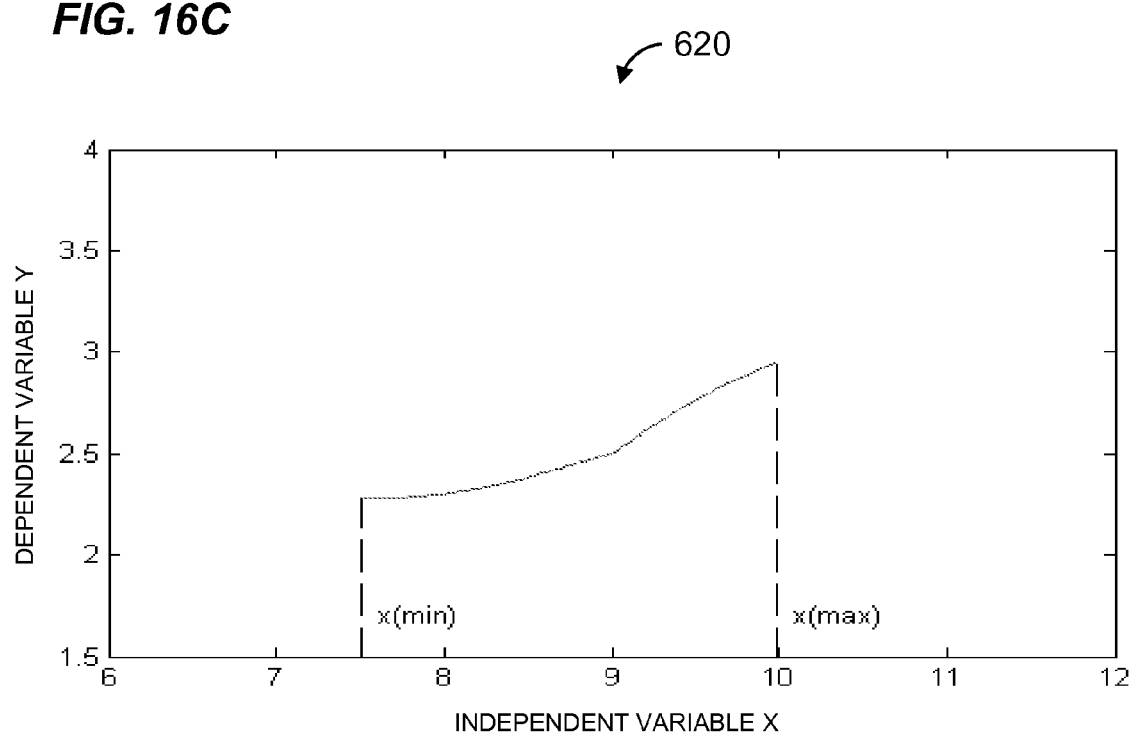
FIG. 16C is a graph showing an updated model and its range of validity.

Referring again to FIG. 17, at a block 720, the validity range may be updated. For example, if $X_{MAX\_1}$ is less than $X_{MIN\_2}$, then $X_{MIN}$ may be set to $X_{MIN\_1}$ and $X_{MAX}$ may be set to $X_{MAX\_2}$ Similarly, if $X_{MAX\_2}$ is less than $X_{MIN\_1}$, then $X_{MIN}$ may be set to $X_{MIN\_2}$ and $X_{MAX}$ may be set to $X_{MAX\_1}$ FIG. 16C illustrates the new model with the new validity range.

Figure 18A:
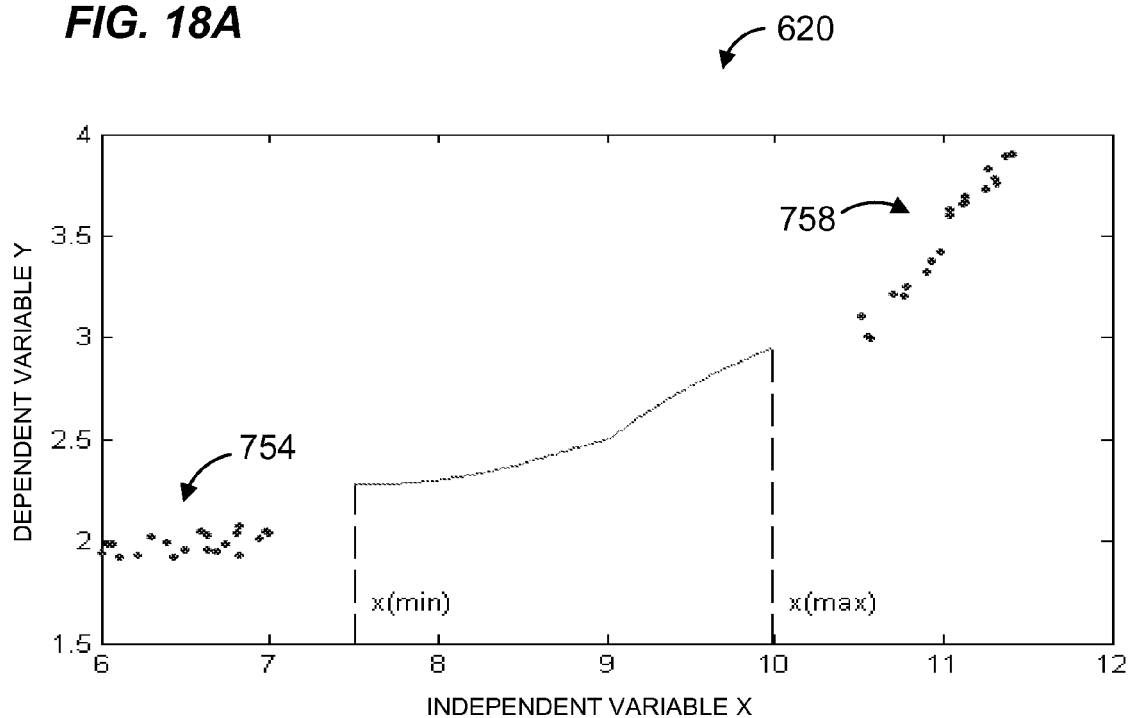
FIG. 18A is a graph showing a plurality of data sets that may be used by the model of FIG. 3 and/or the model of FIG. 4 to develop further regression models in different operating regions.
Figure 18B:
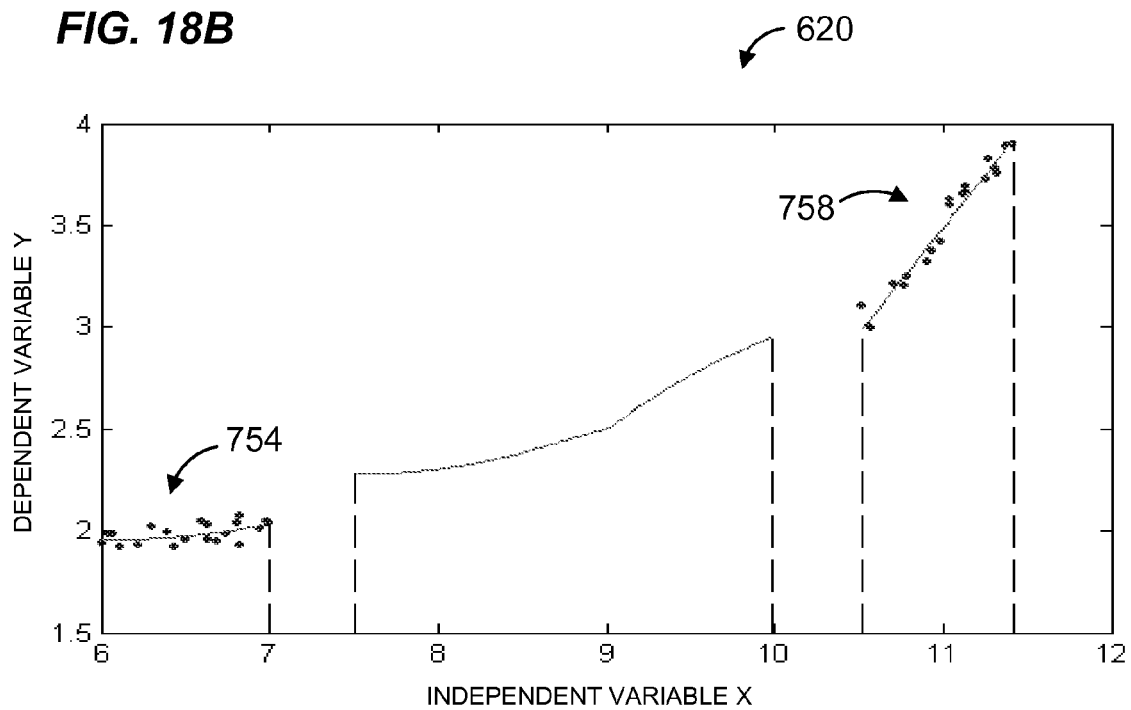
FIG. 18B is a graph showing a further regression models developed using the plurality of data sets of FIG. 18A.
Figure 18C:
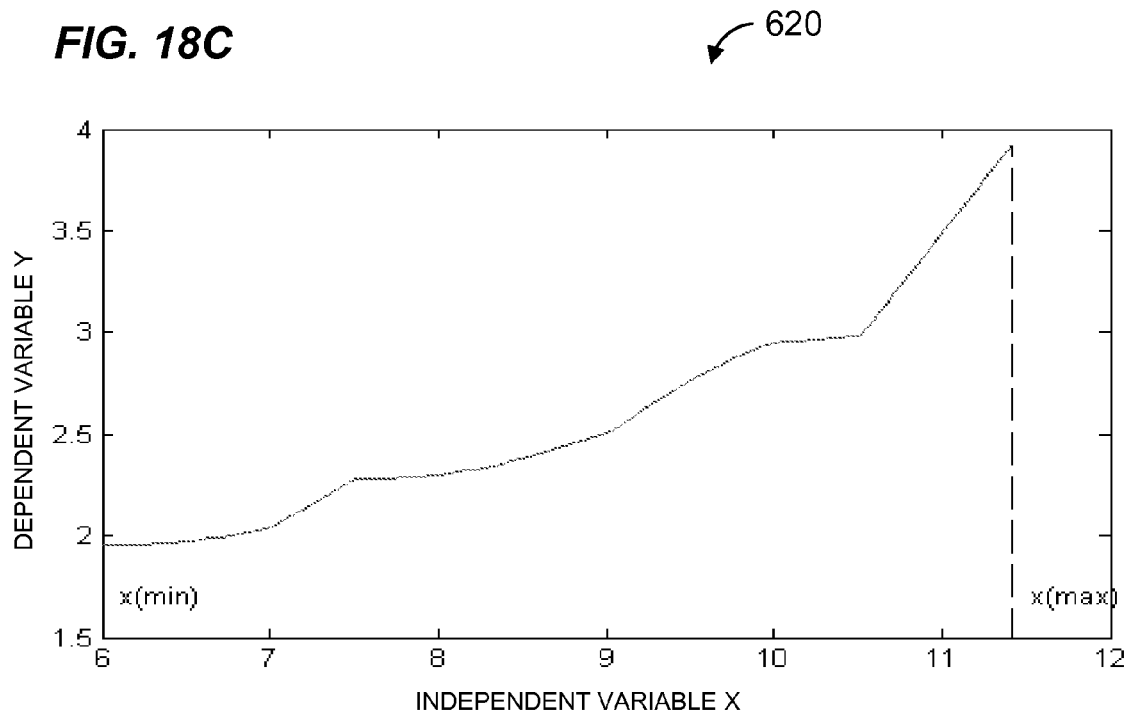
FIG. 18C is a graph showing a further updated model and its range of validity.

Referring now to FIGS. 14 and 17, the model may be updated a plurality of times using a method such as the method 676. For example, FIG. 18A illustrates a first group 754 of data sets and a second group 758 of data sets outside of the validity region corresponding to the model illustrated in FIG. 16C, and FIG. 18B illustrates curves corresponding to regression models generated for the first group 754 of data sets and the second group 758 of data sets. Additionally, FIG. 18C illustrates a new updated model that includes the regression models generated for the first group 754 of data sets and the second group 758 of data sets as well as new interpolation models. Further, 18C illustrates a new validity range for the model.

The abnormal situation prevention system 35 (FIGS. 1 and 2) may cause, for example, graphs similar to some or all of the graphs illustrated in FIGS. 13A, 13B, 13C, 15A, 15B, 16A, 16B, 16C, 18A, 18B and 18C to be displayed on a display device. For instance, if the AOD system 100 provides model criteria data to the abnormal situation prevention system 35 or a database, for example, the abnormal situation prevention system 35 may use this data to generate a display illustrating how the model 104 is modeling the dependent variable Y as a function of the independent variable X. For example, the display may include a graph similar to one or more of the graphs of FIGS. 13C, 16C and 18C. Optionally, the AOD system 100 may also provide the abnormal situation prevention system 35 or a database, for example, with some or all of the data sets used to generate the model 104. In this case, the abnormal situation prevention system 35 may use this data to generate a display having a graph similar to one or more of the graphs of FIGS. 13A, 13B, 16A, 16B, 18A and 18B. Optionally, the AOD system 100 may also provide the abnormal situation prevention system 35 or a database, for example, with some or all of the data sets that the AOD system 100 is evaluating during its monitoring phase. Additionally, the AOD system 100 may also provide the abnormal situation prevention system 35 or a database, for example, with the comparison data for some or all of the data sets. In this case, as just one example, the abnormal situation prevention system 35 may use this data to generate a display having a graph similar to one or more of the graphs of FIGS. 15A and 15B.

Figure 19:
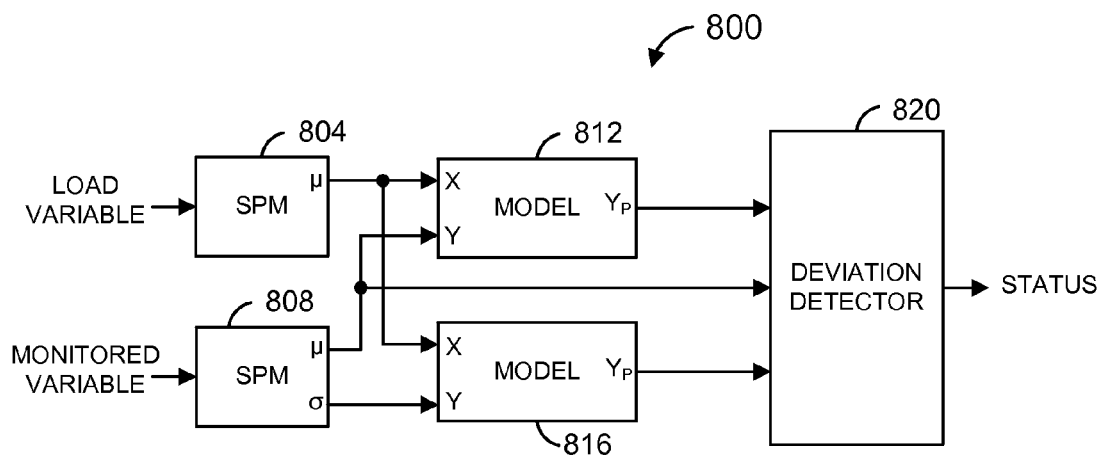
FIG. 19 is another example AOD system that utilizes one or more regression models.

FIG. 19 is a block diagram of another example AOD system 800 that could be used for the abnormal operation detection blocks 80 and 82 of FIG. 2. The AOD system 800 includes a first SPM block 804 and a second SPM block 808. The SPM block 804 receives a load variable associated with a process and generates a mean signal corresponding to the load variable. Similarly, the SPM block 808 receives a monitored variable associated with the process and generates a mean signal based on the monitored variable. Additionally, the SPM block 808 generates a standard deviation signal based on the monitored variable. The mean signals from the SPM block 804 and the SPM block 808, as well as the standard deviation signal from the SPM block 808 may be generated using a variety of techniques, including known techniques. For example, the SPM block 804 could generate mean values by calculating the means of non-overlapping blocks of load variable samples. The blocks could have a fixed length such as a particular number of samples or a time period. As a particular example used for illustrative purposes, if the block was five minutes in length, the SPM block 804 would generate a mean value every five minutes. The configuration application 38, for example, could be used to configure the SPM blocks 804 and 808. Optionally, the SPM blocks 804 and 808 may not be readily configurable by an operator.

The mean output of the SPM block 804 is provided as an independent variable (X) input of a model 812, and the mean output of the SPM block 808 is provided as a dependent variable (Y) input of the model 812. The model 812 may comprise a model such as the model 132 of FIG. 4, for example. The mean output of the SPM block 804 is also provided as an independent variable (X) input of a model 816, and the standard deviation output of the SPM block 808 is provided as a dependent variable (Y) input of the model 816. The model 816 may comprise a model such as the model 132 of FIG. 4, for example. The models 812 and 816 may implement some or all of the method 200 of FIG. 6 and/or the method 300 of FIG. 7.

In the AOD system 800, the model 812 generally models the mean of the monitored variable as a function of the mean of the load variable. The model 816 generally models the standard deviation of the monitored variable as a function of the mean of the load variable. This may be useful in situations where the standard deviation of the monitored variable tends to change as the load variable changes.

The $Y_P$ outputs of the models 812 and 816 are provided to a deviation detector 820. Additionally, the mean output of the SPM block 808 is provided to the deviation detector 820. The deviation detector 820 generally compares the mean ($\mu_{mv}$) of the monitored variable to the predicted mean ($\mu_{Pmv}$) generated by the model 812. Additionally, the deviation detector 820 utilizes this comparison as well as the predicted standard deviation ($\sigma_{Pmv}$) generated by the model 816 to determine if a significant deviation has occurred. More specifically, the deviation detector 820 generates a status signal as follows:

if $\mu_{mv} > \mu_{Pmv} + m\sigma_{Pmv}$, then generate the status signal indicating that the mean $\mu_{mv}$ appears to be too high ("UP");

if $\mu_{mv} < \mu_{Pmv} - m\sigma_{Pmv}$, then generate the status signal indicating that the mean $\mu_{mv}$ appears to be too low ("DOWN");

otherwise, generate the status signal indicating that the mean $\mu_{mv}$ appears to be in a normal range ("NO CHANGE").

where m is a real number that may be fixed or may be modifiable by a user. As a default, m could be set to 3, for example. Of course, any other suitable default value could be used. The value of m could be configured using the configuration application 38, for example. In some implementations, the status signal may be in the form of an alert or alarm.

In one particular implementation, the AOD system 800 could be implemented as a function block, such as a function block to be used in system that implements a Fieldbus protocol. In another implementation, each of some or all of blocks 804, 808, 812, 816 and 820 may be implemented as a separate function block.

Using AOD System in a Level Regulatory Control Loop

Figure 20:
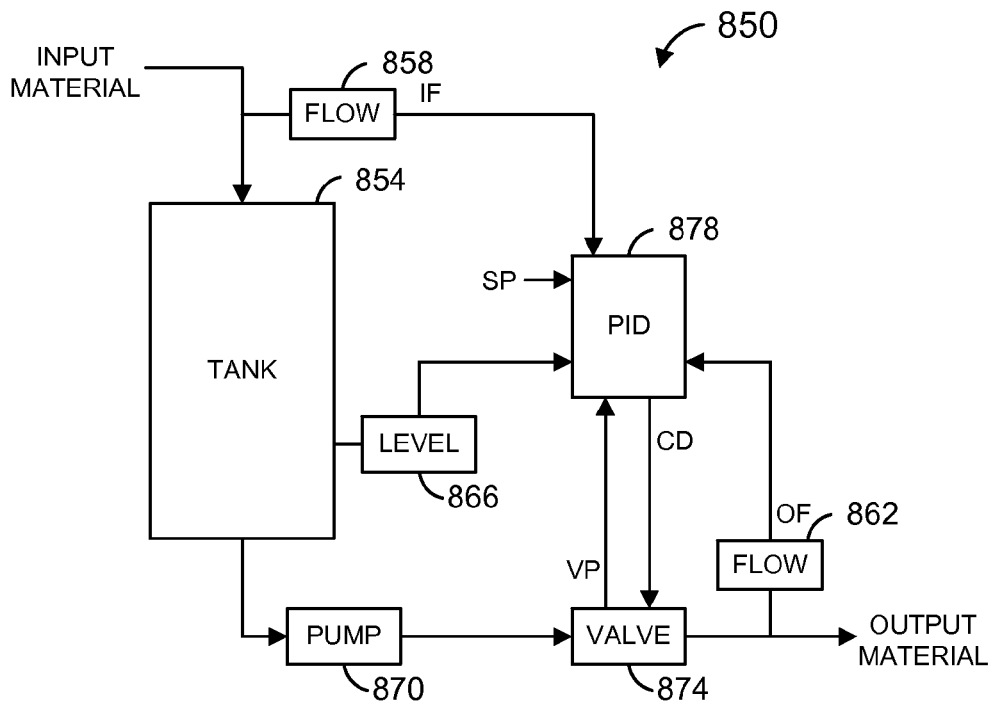
FIG. 20 is a block diagram of an example control system for regulating the level of material in a tank.

AOD systems such as those described above can be used in various ways in a process plant to facilitate abnormal situation prevention. An example of using AOD systems to prevent an abnormal situation in a process plant will be described with reference to FIGS. 20 and 21. FIG. 20 is a block diagram of an example control system 850 for regulating the level of material in a tank 854. A control system such as the control system 850 is often referred to in the process control industry as a Level Regulatory Control Loop. The control system 850 includes a flow sensor 858 to sense the flow of material into the tank 854, and a flow sensor 862 to sense the flow of material exiting the tank 854. The flow sensor 858 may generate a signal IF indicative of the flow rate of material entering the tank 854, for example, and the flow sensor 862 may generate a signal OF indicative of the flow rate of material exiting the tank 854, for example. The control system 850 may also include a level sensor 866 to sense the level of material in the tank 854. The level sensor 866 may generate a signal LVL indicative of the level of material in the tank 854, for example.

A pump 870 may facilitate draining material from the tank 854, and a valve 874 may be used to regulate the flow rate of material exiting the tank. A position of the valve may be altered using a control demand (CD) signal in a manner well known to those of ordinary skill in the art. The valve 874 may include a sensor that generates a signal VP indicative of the position of the valve.

A PID control routine 878 may be used to control the valve 874 in order to regulate the level of material in the tank 854 according to a set point (SP). Any of a variety of suitable control routines may be utilized for the PID control routine 878. In general, such a routine may utilize one or more of the following signals to generate a control demand (CD) signal to appropriately control the valve 874: SP, LVL, VP, IF and/or OF.

In control systems such as the control system 850, two typical abnormal conditions are encountered: a measurement drift and a valve problem. The measurement drift condition may be indicative of a problem with a sensor, such as the level sensor 866. For example, a measurement drift condition may result in the signal LVL not accurately indicating the actual level in the tank 854. The valve problem condition may indicate a problem with the valve 874. This may result, for example, in the VP signal indicating a different valve position than that indicated by the CD signal. With prior art techniques, such underlying problems may cause another problem to occur, such as the level in the tank becoming too high or too low. This may lead to an alert or alarm being generated. But it may take an operator some time to determine the underlying problem that led to the alert/alarm.

Figure 21:
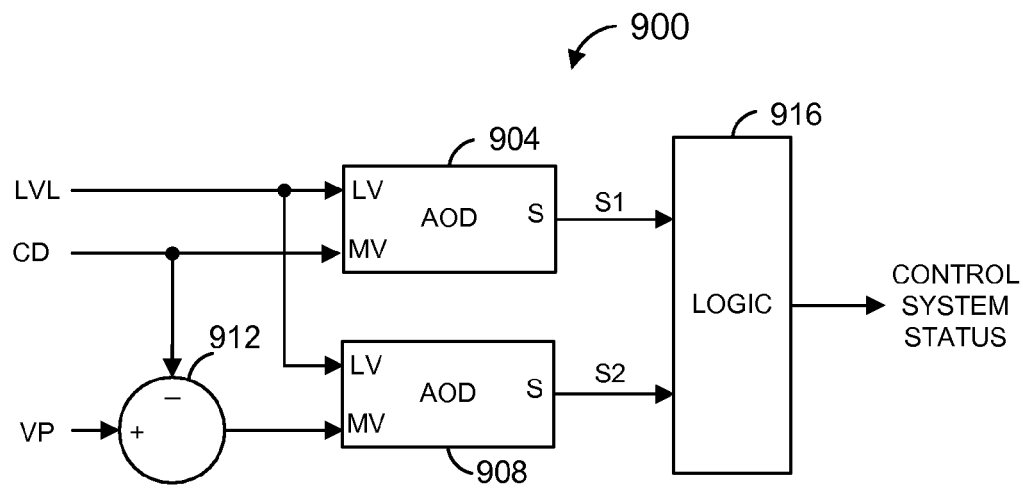
FIG. 21 is a block diagram of an example system that may be used to detect an abnormal condition associated with the control system of FIG. 20.

FIG. 21 is a block diagram of an example system 900 that may be used to detect an abnormal condition associated with the control system 850 of FIG. 20. It is to be understood, however, that the system 900 could be used with other control systems as well. It is believed that a system such as the system 900 may help to detect a measurement drift or valve problem before such underlying conditions lead to a more serious problem such as a tank level being too high or too low. Thus, the system 900 may help to limit down time because, for example, replacement parts could be ordered in advance of a shut down. Similarly, economic loss may be reduced because a shut down could be scheduled in advance, as opposed to the system being shut down immediately in response to tank level alarm. Alternatively, a faulty sensor or valve could be replaced without shutting the process down.

The system 900 includes a first AOD block 904 and a second AOD block 908. Each of the AOD blocks 904 and 908 may comprise an AOD system such as the AOD system 800 of FIG. 19. Thus, each of the AOD blocks 904 and 908 may include a load variable (LV) input, a monitored variable (MV) input, and a status (S) output as in the AOD system 800 of FIG. 19.

Referring now to FIGS. 20 and 21, the LVL signal may be provided to the LV input of the AOD block 904 and also to the LV input of the AOD block 908. The CD signal may be provided to the MV input of the AOD block 904. The CD signal may also be provided to a subtraction block 912, along with the VP signal. The subtraction block 912 may generate an output signal VP-CD, which may be provided to the MV input of the AOD block 908. In the system 900, the AOD block 904 generally models the mean of the CD signal as a function of the mean of the LVL signal. Similarly, the AOD block 908 generally models the mean of the signal VP-CD as a function of the mean of the LVL signal.

A status signal S1 generated by the AOD block 904 and a status signal S2 generated by the AOD block 908 may be provided to a logic block 916. The signals S1 and S2 may be generated in the manner described with respect to FIG. 19. The logic block 916 may generate a control system status signal that generally indicates whether an abnormal condition has been detected and provides information as to the type of abnormal condition. For example, the logic block 916 may generate an indicator of a valve problem if the status signal S2 has a value of either "UP" or "DOWN". Also, the logic block 916 may generate an indicator of a measurement drift problem if the status signal S2 has a value of "NO CHANGE" and the status signal S1 has a value of either "UP" or "DOWN". If the status signals S1 and S2 both have values of "NO CHANGE," the logic block 916 may generate an indicator that no abnormal condition has been detected.

One of ordinary skill in the art will recognize that a system similar to the system 900 of FIG. 21 could be utilized to detect other types of abnormal conditions associated with a control system such as the control system 850 of FIG. 20. For example, a similar system could be used to detect a liquid leak condition, a head loss condition, etc.

In one particular implementation, the system 900 could be a function block, such as a function block to be used in system that implements a Fieldbus protocol. In another implementation, each of at least some of the blocks 904, 908, 912, and 916 may be implemented as a function block.

Although the methods described above were in the context of abnormal detection systems, these methods and models may be used in other process control contexts as well in which generating a model of a process variable or variables is useful. Further, although the methods and systems described above utilized linear regression, one of ordinary skill in the art will recognize that the methods described above may be extended to be used with non-linear regression models as well. One of ordinary skill in the art will also recognize that the linear or non-linear regression models may model multiple dependent variables as functions of multiple independent variables.

The AOD systems, models, regression models, interpolation models, deviation detectors, logic blocks, method blocks, etc., described herein may be implemented using any combination of hardware, firmware, and software. Thus, systems and techniques described herein may be implemented in a standard multi-purpose processor or using specifically designed hardware or firmware as desired. When implemented in software, the software may be stored in any computer readable memory such as on a magnetic disk, a laser disk, or other storage medium, in a RAM or ROM or flash memory of a computer, processor, I/O device, field device, interface device, etc. Likewise, the software may be delivered to a user or a process control system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a process control system via a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for modeling behavior in a process plant, comprising:
   receiving M process variable data sets, wherein M is an integer;
   calculating statistical data for process variables associated with the M process variable data sets using the M process variable data sets and not using additional process variable data sets;
   scaling the M process variable data sets using the statistical data;
   calculating, using a computing device, a plurality of intermediate modeling terms using the scaled M process variable data sets;
   storing the plurality of intermediate modeling terms in a memory of the computing device;
   receiving additional process variable data sets associated with the process variables;
   scaling the additional process variable data sets using the statistical data;
   after calculating the plurality of intermediate modeling terms using the scaled M process variable data sets, updating, using the computing device, the plurality of intermediate modeling terms using the stored intermediate modeling terms and the scaled additional process variable data sets, and without using the M process variable data sets; and
   calculating, using the computing device, a model of at least one of the process variables associated with the M process variable data sets using the updated plurality of intermediate modeling terms.

2. A method according to claim 1, further comprising:
   before calculating the plurality of intermediate modeling terms using the scaled M process variable data sets, initializing the plurality of intermediate modeling terms;
   before calculating the plurality of intermediate modeling terms using the scaled M process variable data sets, updating the plurality of intermediate modeling terms using the M process variable data sets; and
   replacing the plurality of intermediate modeling terms updated using the M process variable data sets with the plurality of intermediate modeling terms calculated using the scaled M process variable data sets.

3. A method according to claim 1, wherein updating the plurality of intermediate modeling terms using the stored intermediate modeling terms and the scaled additional process variable data sets, without using the M process variable data sets, comprises updating the plurality of intermediate modeling terms for each scaled additional process variable data set.

4. A method according to claim 1, wherein calculating the model comprises calculating a regression model.

5. A method according to claim 4, wherein calculating the regression model comprises calculating a linear regression model.

6. A method according to claim 5, wherein calculating the plurality of intermediate modeling terms using the scaled M process variable data sets comprises calculating a plurality of sums of powers of the process variables.

7. A method according to claim 6, wherein calculating the statistical data comprises:
   calculating means of the process variables using the M process variable data sets; and calculating standard deviations of the process variables using the M process variable data sets.

8. A method according to claim 7, wherein scaling the process variable data sets comprises, for each of the M process variable data sets:
  subtracting the corresponding mean from each component of the process variable data set; and
  subsequent to subtracting the corresponding mean from each component of the process variable data set, dividing each component of the process variable data set by the corresponding standard deviation.

9. A method according to claim 8, wherein scaling the additional process variable data sets, comprises, for each of the additional process variable data sets:
  subtracting the corresponding mean from each component of the process variable data set; and
  subsequent to subtracting the corresponding mean from each component of the process variable data set, dividing each component of the process variable data set by the corresponding standard deviation.

10. A method according to claim 4, wherein calculating the regression model comprises calculating a non-linear regression model.

11. A method according to claim 1, wherein receiving M process variable data sets comprises receiving at least one of process variable values, filtered process variable values, or statistical data generated from process variable values; and
  wherein receiving additional process variable data sets comprises receiving at least one of process variable values, filtered process variable values, or statistical data generated from process variable values.

12. A method according to claim 1, further comprising monitoring the at least one process variable for abnormal operation using the model.

13. A method according to claim 12, further comprising:
  determining whether at least one of the at least one process variable significantly deviates from the model; and
  generating an indicator of abnormal operation if it is determined that the at least one of the at least one process variable significantly deviates from the model.

14. A method according to claim 1, wherein receiving M process variable data sets comprises receiving data via a communication network; and
  wherein receiving the additional process variable data sets comprises receiving data via the communication network.

15. A method according to claim 1, wherein calculating the model of the at least one process variable comprises calculating a model of the at least one process variable as a function of at least one other process variable.

16. A method according to claim 1, wherein calculating the model of the at least one process variable comprises calculating a model of a first plurality of process variables as a function of a second plurality of process variables.

17. A method according to claim 1, wherein calculating the model of the at least one process variable using the updated plurality of intermediate modeling terms comprises calculating the model of the at least one process variable without calculating additional statistical data based on the additional process variable data sets.

18. A system for modeling behavior in a process plant, comprising:
  a memory;
  a processor coupled to the memory, the processor configured according to machine readable instructions stored in the memory to:
    calculate statistical data for process variables associated with M process variable data sets using the M process variable data sets and not using additional process variable data sets, the M process variable data sets stored in the memory, wherein M is an integer,
    scale the M process variable data sets using the statistical data,
    calculate a plurality of intermediate modeling terms using the scaled M process variable data sets,
    store the plurality of intermediate modeling terms in the memory,
    scale additional process variable data sets using the statistical data,
    after calculating the plurality of intermediate modeling terms using the scaled M process variable data sets, update the plurality of intermediate modeling terms using the stored intermediate modeling terms and the scaled additional process variable data sets, and without using the M process variable data sets, and
    calculate a model of at least one of the process variables associated with the M process variable data sets using the updated plurality of intermediate modeling terms.

19. A system according to claim 18, wherein the processor is further configured according to machine readable instructions stored in the memory to monitor the at least one process variable for abnormal operation using the model.

20. A system according to claim 19, wherein the processor is further configured according to machine readable instructions stored in the memory to:
  determine whether at least one of the at least one process variable significantly deviates from the model, and
  generate an indicator of abnormal operation if it is determined that the at least one of the at least one process variable significantly deviates from the model.

21. A computer-readable storage medium storing machine readable instructions, the machine readable instructions capable of causing one or more machines to:
  calculate statistical data for process variables associated with M process variable data sets using the M process variable data sets and not using additional process variable data sets, the M process variable data sets stored in a memory, wherein M is an integer;
  scale the M process variable data sets using the statistical data;
  calculate a plurality of intermediate modeling terms using the scaled M process variable data sets;
  store the plurality of intermediate modeling terms in the memory;
  scale additional process variable data sets using the statistical data;
  after calculating the plurality of intermediate modeling terms using the scaled M process variable data sets, update the plurality of intermediate modeling terms using the stored intermediate modeling terms and the scaled additional process variable data sets, and without using, the M process variable data sets; and
  calculate a model of at least one of the process variables associated with the M process variable data sets using the updated plurality of intermediate modeling terms.

22. A computer-readable storage medium storing machine readable instructions according to claim 21, the machine readable instructions further capable of causing one or more machines to monitor the at least one process variable for abnormal operation using the model.

23. A computer-readable storage medium storing machine readable instructions according to claim 22, the machine readable instructions further capable of causing one or more machines to:
- determine whether at least one of the at least one process variable significantly deviates from the model, and
- generate an indicator of abnormal operation if it is determined that the at least one of the at least one process variable significantly deviates from the model.

24. A system for detecting an abnormal operation in a process plant, comprising:
- a configurable model of a process in the process plant, wherein the configurable model is implemented by a first computing device, and wherein the configurable model:
  - receives M process variable data sets, wherein M is an integer,
  - calculates statistical data for process variables associated with the M process variable data sets using the M process variable data sets and not using additional process variable data sets,
  - scales the M process variable data sets using the statistical data,
  - calculates a plurality of intermediate modeling terms using the scaled M process variable data sets,
  - stores the plurality of intermediate modeling terms in a memory,
  - receives additional process variable data sets associated with the process variables,
  - scales the additional process variable data sets using the statistical data,
  - after calculating the plurality of intermediate modeling terms using the scaled M process variable data sets, updates the plurality of intermediate modeling terms using the stored intermediate modeling terms and the scaled additional process variable data sets, and without using he M process variable data sets, and
  - calculates a model of at least one of the process variables associated with the M process variable data sets using the updated plurality of intermediate modeling terms;
- the system further comprising a deviation detector coupled to the configurable model, wherein the deviation detector is implemented by the first computing device or a second computing device, and wherein the deviation detector is configured to determine if the process significantly deviates from an output of the model.

25. A system according to claim 24, wherein the first computing device comprises a first processor that executes machine readable instructions including instructions to:
- calculate the plurality of intermediate modeling terms using the scaled process variable data sets,
- update the plurality of intermediate modeling terms using the stored intermediate modeling terms and the scaled additional process variable data sets, and without using the M process variable data sets, and
- calculate the model of the at least one process variable using the updated plurality of intermediate modeling terms.

26. A system according to claim 25, wherein the deviation detector is implemented by the second computing device, and wherein the second computing device comprises a second processor that executes machine readable instructions including instructions to determine if the process significantly deviates from the output of the model.

* * * * *

UNITED STATES PATENT AND TRADEMARK OFFICE
CERTIFICATE OF CORRECTION

PATENT NO. : 8,032,340 B2
APPLICATION NO. : 11/619830
DATED : October 4, 2011
INVENTOR(S) : John P. Miller It is certified that error appears in the above-identified patent and that said Letters Patent is hereby corrected as shown below:

In the Claims:

At Column 46, line 4, "he" should be -- the --.

Signed and Sealed this
Nineteenth Day of March, 2013

Teresa Stanek Rea
*Acting Director of the United States Patent and Trademark Office*